United States Patent [19]
Ballas et al.

[11] Patent Number: 4,800,652
[45] Date of Patent: Jan. 31, 1989

[54] MACHINE FOR MEASURING GENERALLY CIRCULAR OBJECTS IN CYLINDRICAL COORDINATES

[75] Inventors: Thomas A. Ballas; William E. Harbottle, both of North Canton; Russell W. Keller, Stark County, all of Ohio

[73] Assignee: The Timken Company, Canton, Ohio

[21] Appl. No.: 101,205

[22] Filed: Sep. 25, 1987

[51] Int. Cl.$^4$ .............................................. G01B 5/25
[52] U.S. Cl. ...................... 33/552; 33/504; 33/520; 33/558; 33/568
[58] Field of Search ............ 33/552, 503, 178 E, 33/178 R, 557, 558, 520, 556, 504, 568

[56] References Cited

U.S. PATENT DOCUMENTS

| | | | |
|---|---|---|---|
| 1,846,787 | 2/1932 | Buchmuller | 33/520 |
| 3,386,174 | 6/1968 | Leach et al. | 33/174 |
| 3,561,125 | 2/1971 | Zeidler | 33/174 |
| 3,774,312 | 11/1973 | Each | 33/174 L |
| 3,808,696 | 5/1974 | Possati | 33/178 E |
| 3,816,930 | 6/1974 | Edenholm | 33/174 TA |
| 3,944,798 | 3/1976 | Eaton | 235/151.3 |
| 3,987,551 | 10/1976 | Kienle | 33/169 R |
| 3,996,669 | 12/1976 | Anichini | 33/172 E |
| 4,099,800 | 7/1978 | Bell et al. | 308/6 R |
| 4,207,680 | 6/1980 | Bell et al. | 33/174 R |
| 4,213,244 | 7/1980 | Bell et al. | 33/1 M |
| 4,228,591 | 10/1980 | Sterki et al. | 33/174 L |
| 4,235,019 | 11/1980 | Cho | 33/174 TA |
| 4,240,205 | 12/1980 | Tuss | 33/1 M |
| 4,333,238 | 6/1982 | McMurtry | 33/174 L |
| 4,341,019 | 7/1982 | Possati | 33/172 E |
| 4,344,233 | 8/1982 | Albertazzi | 33/178 E |
| 4,364,178 | 12/1982 | Huet | 33/174 L |
| 4,389,781 | 6/1983 | Donaldson | 33/1 M |
| 4,389,787 | 6/1983 | Solaroli | 33/174 Q |
| 4,417,400 | 11/1983 | Dall'Aglio | 33/172 E |
| 4,437,151 | 3/1984 | Hurt et al. | 364/571 |
| 4,466,190 | 8/1984 | Ross et al. | 33/1 M |
| 4,503,614 | 3/1985 | Tuss | 33/1 M |
| 4,507,868 | 4/1985 | Tuss | 33/1 M |
| 4,563,824 | 1/1986 | Baun | 33/552 |
| 4,594,791 | 6/1986 | Brandstetter | 33/503 |
| 4,610,089 | 9/1986 | Bell et al. | 33/1 M |
| 4,630,374 | 12/1986 | Raleigh | 33/1 M |
| 4,630,381 | 12/1986 | Sakata et al. | 33/503 |
| 4,653,196 | 3/1987 | Moschner et al. | 33/552 |
| 4,706,972 | 11/1987 | Kormos | 33/520 |

Primary Examiner—William D. Martin, Jr.
Attorney, Agent, or Firm—Gravely, Lieder & Woodruff

[57] ABSTRACT

A machine measures an object of generally circular cross-section by superimposing on the subject a cylindrical coordinate system having five axes, namely a vertical measuring axis Z, three radial axes R0, R120, R240 emanating at a common point along the measuring axis Z, and a rotational axis $\theta$ having its center at the measuring axis Z. The machine includes an elevating unit which supports the object with its axis generally parallel to the measuring axis Z and is further capable of moving the object parallel to the measuring axis Z as well as rotationally about the measuring axis Z along the rotational axis $\theta$. A measuring device monitors the linear position of the object along the axis Z while another measuring device measures the angular position of the object along the rotational axis $\theta$. In addition, the machine includes three measuring heads, there being one along each radial axes R0, R120, and R240, and each measuring head includes a base, a slide which is mounted on the base for movement parallel to the radial axis of its head, and a probe carried by the slide. The probe has a displaceable probe tip which bears against a surface on the object. Each measuring head has a measuring device for monitoring the position of its slide relative to the slide base and as well as another monitoring device which may be used to monitor the position of the probe tip relative to the slide along the radial axis R or the position of the probe tip parallel to the measuring axis Z. The machine scans the object by effecting relative movement between the object and probe tips parallel to one of the axes while at least one of the probe tips remains against the object, and by taking measurements at equally spaced intervals along another of the axes. Thus, it is possible to make an axial scan, a radial scan, a rotary scan along a circumferential surface or a rotary scan along an end surface.

32 Claims, 16 Drawing Sheets

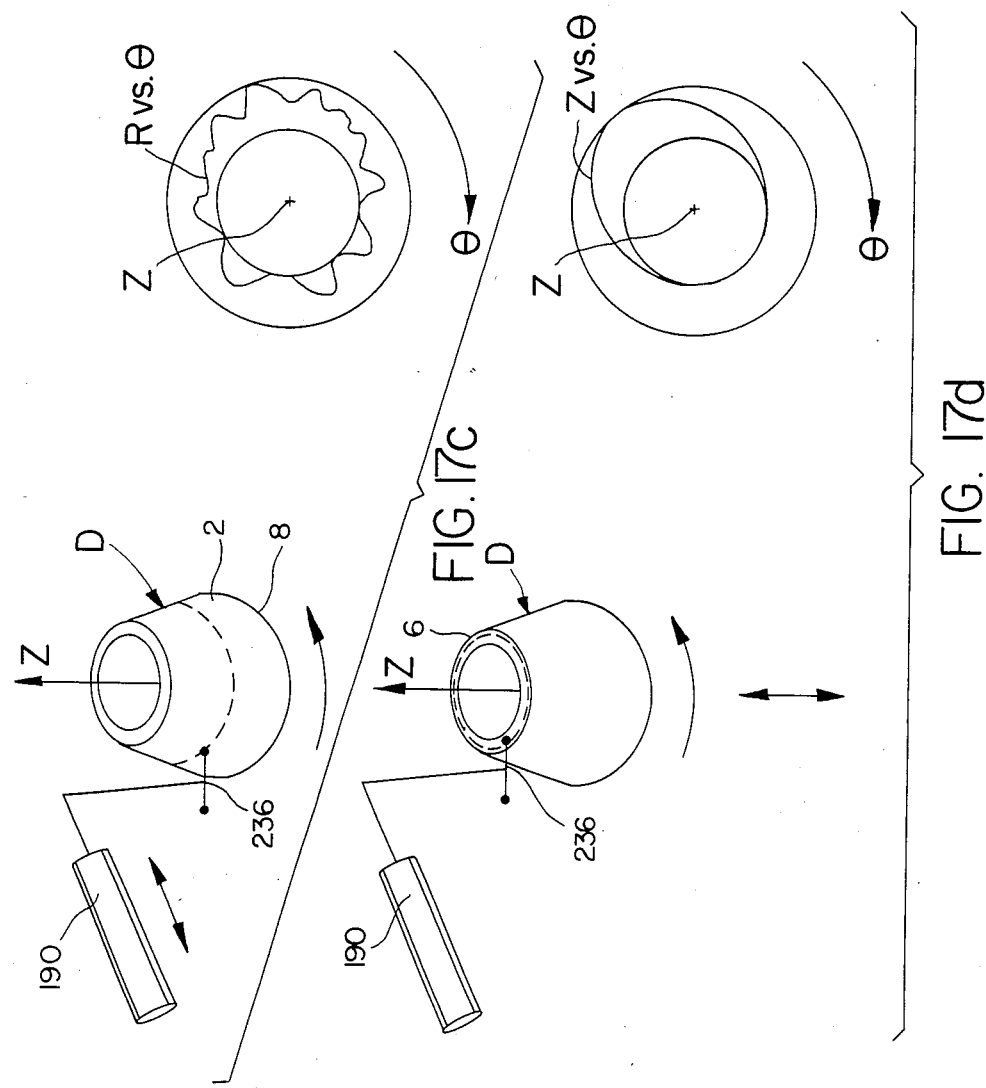

MACHINE FOR MEASURING GENERALLY CIRCULAR OBJECTS IN CYLINDRICAL COORDINATES

BACKGROUND OF THE INVENTION

This invention relates in general to measuring and more particularly to a measuring machine and process that are particularly suited for making measurements on objects of generally circular cross-section.

Some manufacturing industries require parts that are machined with a considerable amount of precision, and to determine whether such parts are within tolerance, measuring devices are required that are even more precise. So-called coordinate measuring machines exist which move a single probe along three axes of a typical cartesian coordinate system to determine the position of the probe—and of course the position of the surface which it contacts—within the system, but these machines are best suited for measuring rectilinear objects. Circular objects, on the other hand, present opportunities for such machines to accumulate errors and thus lose the precision required for meaningful measurements.

The typical coordinate measuring machine has a single probe which moves upwardly and downwardly as well as laterally. Upon contacting a point on the surface of an object that is to be measured, the machine registers a reading. Thereupon, the probe backs away and moves to another point on the object where another reading is registered. By making several measurements at representative locations on the object, the dimensions of the object may be ascertained along with a general indication of its contour, but this touch-probe procedure consumes a considerable amount of time. It is susceptible to error, since it uses one probe contact to determine the position of a relatively large surface area. If that contact occurs at a depression, such as that left by a cutting tool, the measurement for the entire surface area will be misleading.

Other single probe coordinate measuring machines employ an analog probe that remains in continuous contact with the surface that is to be measured and thereby allows continuous measurements to be taken from that surface. Here again, the single probe and the rectilinear character of its operation limit the ability of the machine to measure circular objects.

Still other measuring machines are designed to measure profiles, that is to say the contour of surfaces, and the typical machine of this character likewise employs a probe. However, instead of touching the object, registering a measurement and then backing off to move to another location, the probe actually moves over the surface, remaining in contact with the surface as it does. The machine measures the displacement of the probe from a straight line as the probe moves over the surface and amplifies those displacements to produce a trace from which the true contour of the surface may be analyzed. With the typical surface measuring machine, the part must be repositioned on the machine for each surface or profile that is to be measured.

Many precision made parts possess a substantially circular cross-sectional configuration, and typical of these are the components of a tapered roller bearing, that is the cone or inner race, the cup or outer race, and the tapered rollers. With regard to the cone and cup, the diameter and inclination of the tapered raceways are important. Moreover the end faces of those components should be square with respect to their axes. The profiles of the raceways are also significant. All of these bearing surfaces need to be measured accurately and quickly, but current coordinate and profile measuring machines do not provide this capability. Indeed, several gages, each configured for a different surface on a tapered roller bearing, are currently required for checking the accuracy of a single tapered roller bearing. Merely maintaining these gages, and the master gages with which they are compared, consumes considerable effort and expense.

DESCRIPTION OF THE DRAWINGS

In the accompanying drawings which form part of the specification and wherein like numerals and letters refer to like parts wherever they occur

FIGS. 17a thru 17d are a series of schematic views showing various scans of which the machine is capable.

DETAILED DESCRIPTION

Figure 1:
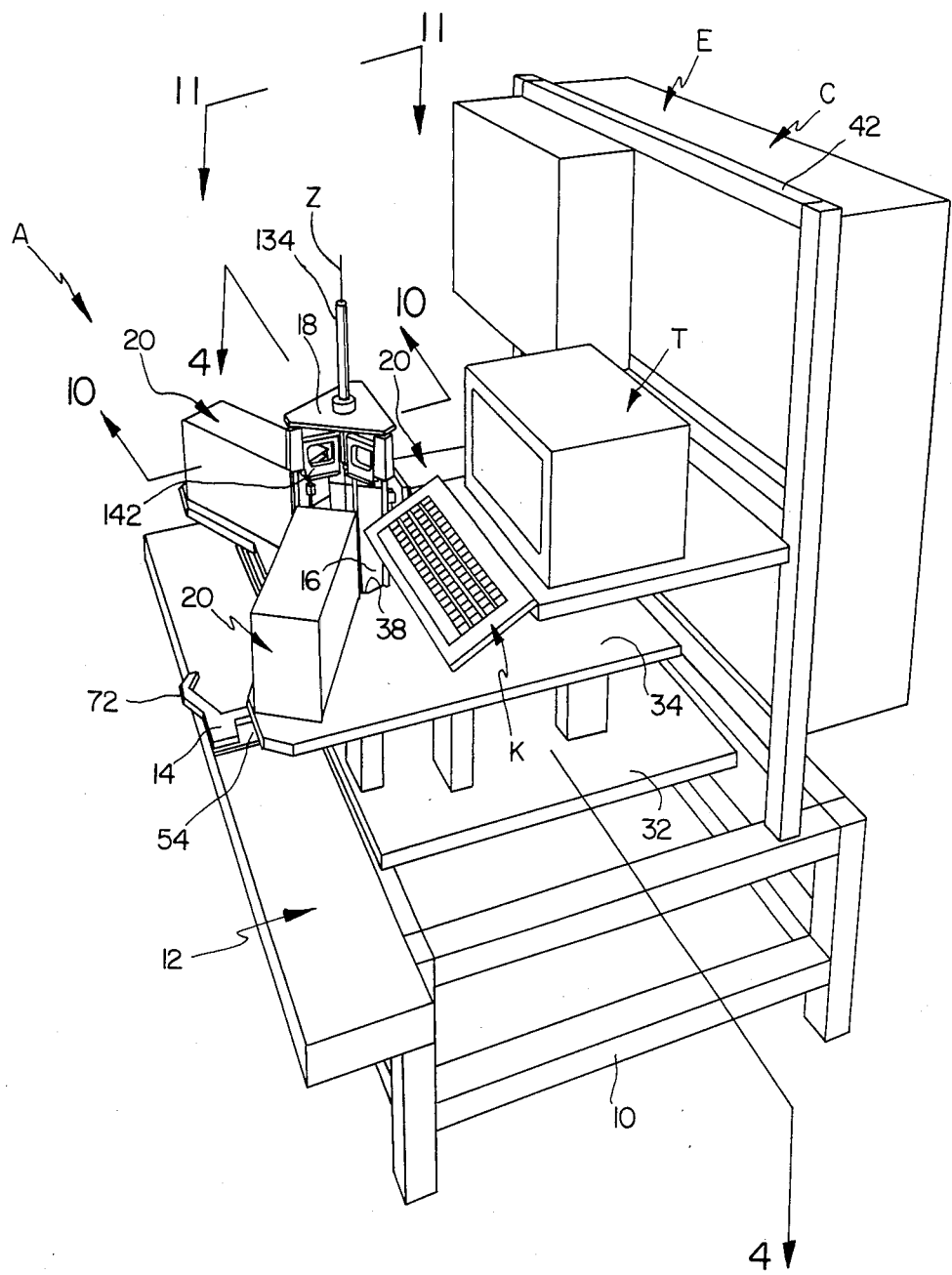
FIG. 1 is a perspective view of a cylindrical coordinate measuring machine constructed in accordance with and embodying the present invention.

Referring now to the drawings, a measuring machine A (FIG. 1) is ideally suited for determining various dimensions, contours, and orientations of surfaces on objects of generally circular cross-section—all with an extremely high degree of precision. Among the measurements which the machine A is capable of making are the diameter of an object, the axial and circumferential profile of the object, the orientation of the end faces with respect to the axis of the object, and the taper of the circular surface, if any. The machine A requires only one reference cylinder B (FIG. 3) from which it derives its calibration, and this cylinder serves as a reference for every object that is to be measured, irrespective of the size or shape of the object. The reference cylinder B remains in the machine A when not in use. For its control and rapid calculations, the machine A looks to its own computer C, and connected with the computer C is a keyboard K for furnishing commands and information to the computer C. The actual numerical measurements made by the machine A are displayed at the machine A itself on a cathode ray tube (CRT) T which is connected with the computer C.

Typical of the surface configurations that the machine A is best suited for measuring are those present on an object or part D (FIG. 2) which is a hollow truncated cone having a tapered outside face 2, a cylindrical inside face 4, flat end faces 6 and 8, and of course an axis X which is perpendicular to the end faces 6 and 8.

Figure 4:
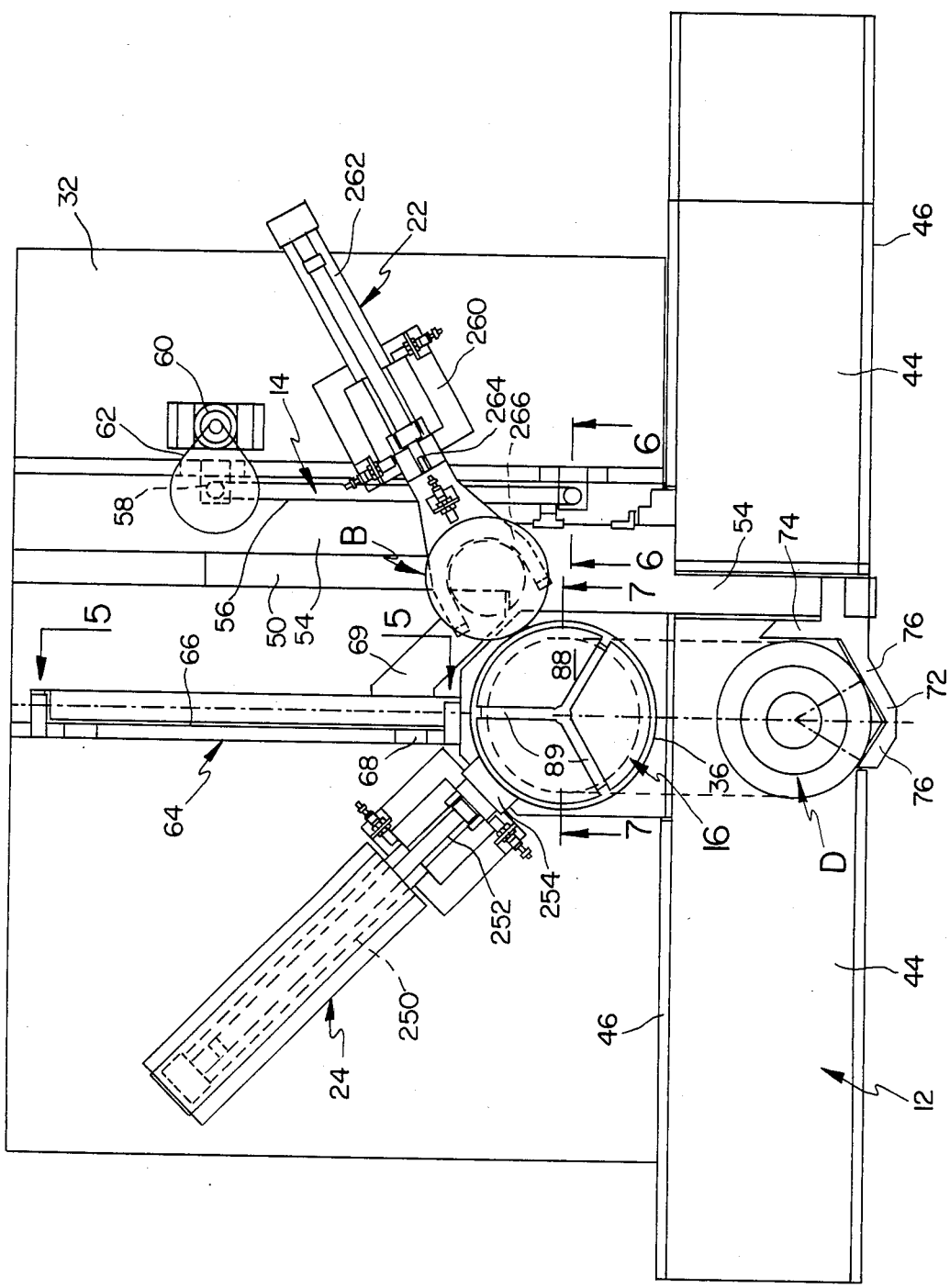
FIG. 4 is a sectional view of the machine taken along line 4—4 of FIG. 1 and showing the conveyor, the platen of the elevating unit, the loading unit, the discharge unit and the carrier unit.

The machine A includes a frame 10 (FIG. 1) which rests on a supporting surface, such as a floor, and in one way or another carries various components which interact to measure the part D when the part D is within the machine A—indeed when it is located along a measuring axis Z which passes vertically through the machine A. Among these components is a conveyor 12 on which the part D is placed prior to being measured and from which it is retrieved once the measurements have been made. Also among them is a loading unit 14 which withdraws a part from the conveyor 12 and locates it along the measuring axis Z such that the axis X of the part D and the axis Z of the machine A coincide within a reasonable tolerance. In addition, the frame 10 supports an elevating unit 16 (FIG. 7) onto which the loading unit 14 moves the part D, and it is while the part D is on the elevating unit 16 that measurements are actually made on it. Indeed, the elevating unit 16 in most instances will move the part D along the measuring axis Z when the measurements are made, and depending on that which is measured, may even rotate the part D about the axis Z. To maintain the part D in a fixed position on the elevating unit 16, a clamping unit 18 bears against the upper end face 6 of the part D. Some of the measurements are derived from three measuring heads 20 which are located around the measuring axis Z. The reference cylinder B from which the machine A derives its calibration is carried within the machine A and is moved onto and off of the elevating unit 16 by a carrier unit 22 (FIG. 4). The machine A further has a discharge unit 24 (FIG. 4) which displaces a part D from the elevating unit 16 once the measurements have been completed and returns the part D to the conveyor 12. The frame 10 carries the computer C, which is another one of the components that interacts to make the measurements, and likewise holds the keyboard K and the CRT T.

Figure 11:
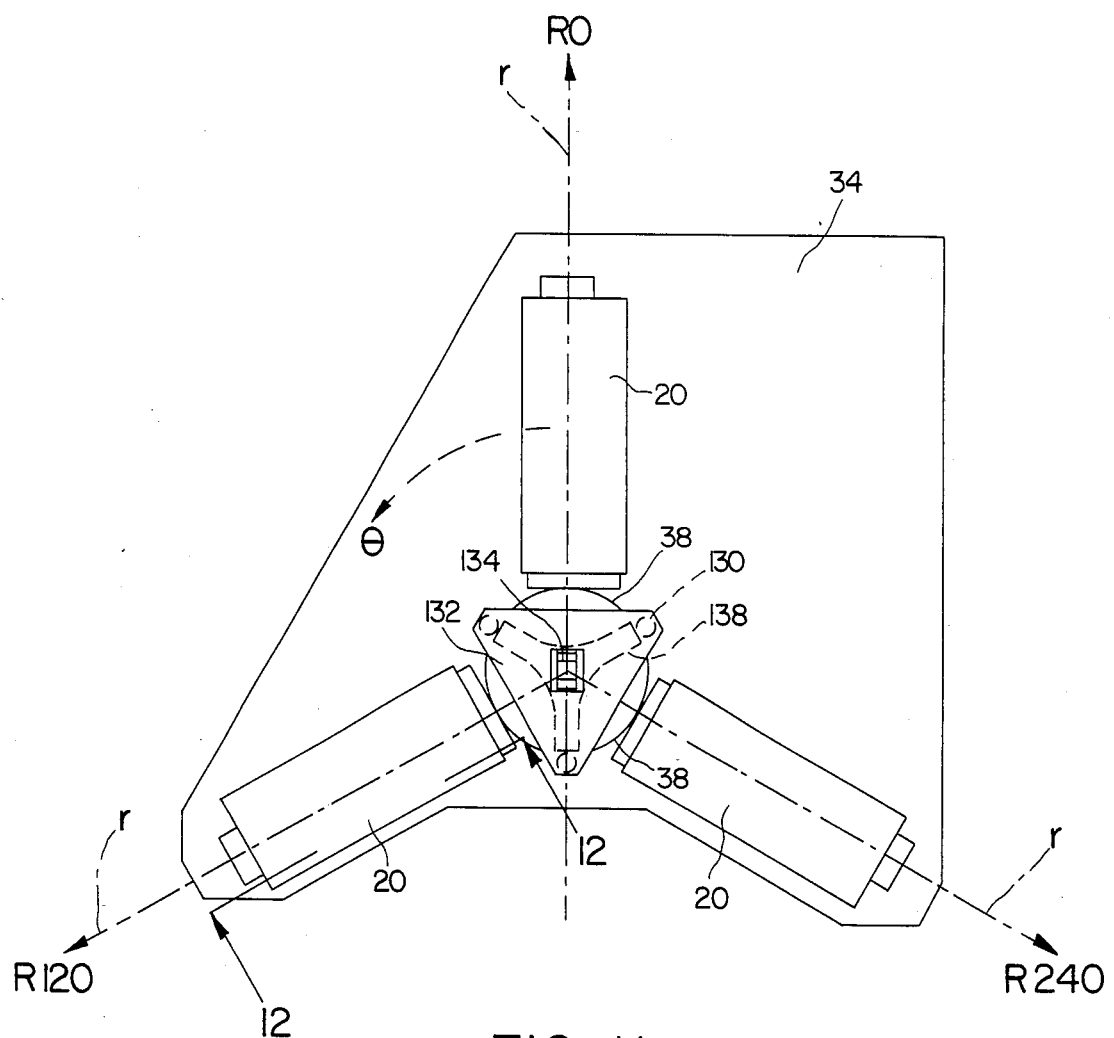
FIG. 11 is a plan view taken along line 11—11 of FIG. 1 and showing both the clamping unit and the three measuring heads.

The frame 10 supports two decks, that is a loading deck 32 and a measuring deck 34, the latter being above the former (FIG. 1). The two decks 32 and 34 are mounted solidly with respect to each other, but are isolated from the frame 10 by vibration isolators. The deck 32 has a circular aperture 36 (FIG. 4) through which the elevating unit 16 is exposed and often projects, while the deck 34 contains a circular aperture 38 (FIG. 11). The two apertures 36 and 38 are aligned along the measuring axis Z. Each aperture 36 and 38 is large enough to accommodate the largest part D which the machine A is capable of measuring. The three measuring heads 20 are attached to the measuring deck 34 at equal intervals, that is at 120° intervals, around the aperture 38, whereas the clamping unit 18 is attached to the measuring deck 34 generally above the aperture 38. The loading unit 14, elevating unit 16, carrier unit 22, and discharge unit 24, on the other hand, are all carried by the loading deck 32. The conveyor 12 is attached to the front of the frame 10. In addition, the frame 10 includes a bridge 42 which extends over the measuring deck 38 and supports the keyboard K and the CRT T, as well as an enclosure E which contains the computer C and circuit boards.

The conveyor 12 extends across the full front of the frame 10 to which it is attached, it having a feed end located at one side of the frame 10 and a discharge end located beyond the other side. Between its two ends, the conveyor 12 has a vibratory carpet 44 and side walls 46 which project upwardly at the sides of the carpet 44. The nap of the carpet 44 is biased toward the discharge end, so that a part D when placed on the feed end with its end face 8 against the carpet 44, will migrate toward the discharge end. Midway between the ends of the conveyor 12, the carpet 44 is interrupted, and the side walls 46 are cut away to accommodate the loading unit 14 which intercepts the part D, removes it from the vibratory carpet 44, and draws it over the loading deck 32 to the measuring axis Z. It is while the part D is along the measuring axis Z that measurements are taken from its faces 2, 4, 6, and 8.

Figure 5:
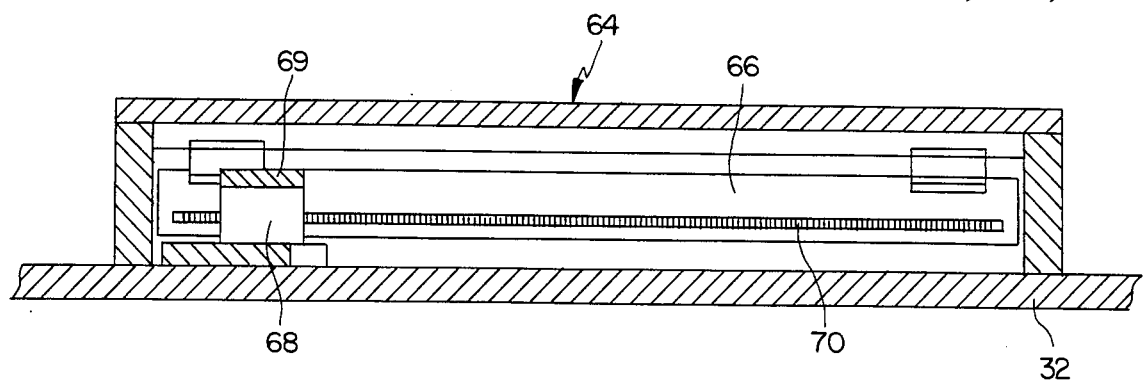
FIG. 5 is a sectional view taken along line 5—5 of FIG. 4 and showing the linear encoder for the loading unit.
Figure 6:
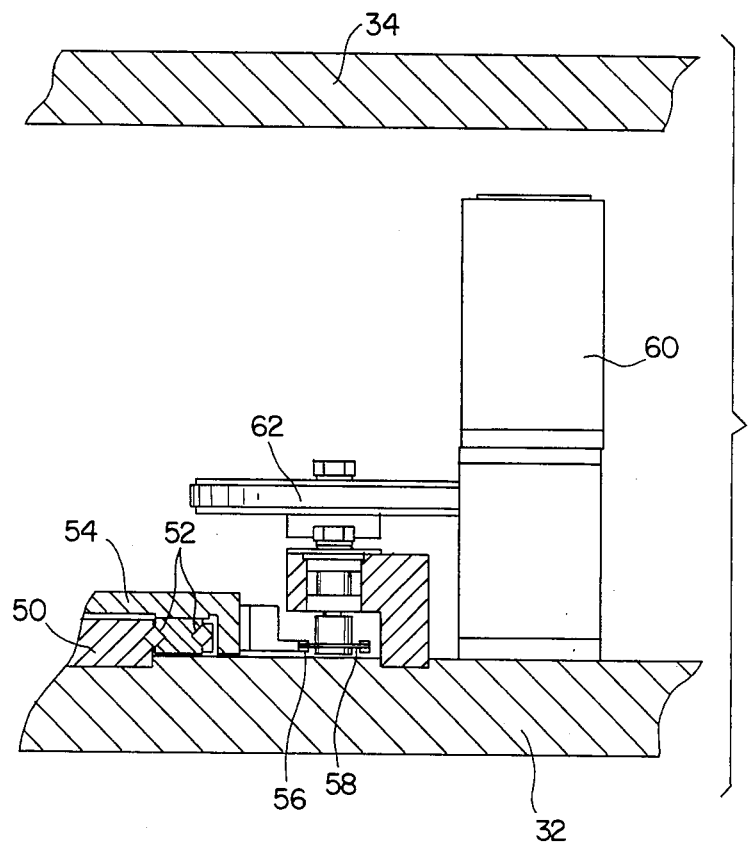
FIG. 6 is a sectional view taken along line 6—6 of FIG. 4 and showing the slide and servomotor for the loading unit.

The loading unit 14 (FIGS. 4–6) for the most part lies in the space between the two decks 32 and 34, it having a base 50 that is attached firmly to the loading deck 32. Located on the base 50 (FIG. 6) is a slideway 52 that is oriented perpendicular to the longitudinal axis of the conveyor 12, and the slideway 52 in turn receives a slide 54 which moves easily along it with little frictional resistance and no lateral or vertical free motion. The slide 54 is attached to an endless chain 56 which loops around sprockets 58 that are mounted on the loading deck 32 to the side of the slide 54. One of these sprockets 58 is in turn coupled to a reversible servomotor 60 through a timing belt drive 62. Thus, the motor 60 moves the slide 54 perpendicular to the conveyor 12 at one side of the elevating unit 16.

This movement of the slide 54 is monitored with considerable precision through a linear encoder 64 (FIGS. 4 & 5) consisting primarily of a glass scale 66 which is attached to the loading deck 32 and a transducer 68 which is carried by the slide 54 and in effect reads the scale 66. Actually, the scale 66 is offset somewhat from the slide 54, it being located along a radial line that emanates from the measuring axis Z and is perpendicular to the conveyor 12. The transducer 68 moves along the scale 66 as the slide 54 moves on its slideway 52, it being attached to the slide 54 by a laterally directed arm 69 (FIG. 4). The scale 66 has a flat surface that lies parallel to the slideway 52, and formed upon this surface is a grating 70 consisting of closely spaced vertical lines. The pitch of the grating 70 may be as fine as 100 lines/mm (2540 lines/in.), so that a separate line exists every 10 microns (0.0004 in.). In that case the width of each line would be about 5 microns (0.0002 in.), while the free space between successive lines would also be 5 microns (0.0002 in.). The transducer 68 contains a lamp which projects a beam of light on the grating 70 and also a photodetector which senses interruptions in the beam. Those interruptions occur as the transducer 68 moves along the scale 66, so by counting the number of interruptions, it is possible to ascertain the displacement of the slide 54 to within 10 microns which translates into (0.0004 in.). The transducer 68 is connected to the computer C and thus provides the computer C with means for ascertaining the position of the slide 54 with enough precision for loading a part.

Linear glass scale encoders suitable for use as the encoder 64 are available from Heidenhain Corporation of Elk Grove Village, Ill., as well as from other manufacturers.

The servomotor 60, which is controlled by the computer C, moves the slide 54 between extended and retracted positions. When in the extended position, the slide 54 projects between the upstream and downstream sections of the vibratory carpet 44 for the conveyor 12 with its upper surface flush with that carpet. At its outer end the slide 54 is fitted with a loading head 72 (FIG. 4) which is configured to intercept a circular part D that is moving along the carpet 44 and to further bring the part D into alignment with the measuring axis Z as the slide 54 retracts. To this end, the loading head 72 has a stop 74 and a pair of drive bars 76 which are arranged at an angle with respect to each other, with the vertex between the two being aligned with the radial line along which the scale 66 of the encoder 64 lies. When the slide 54 is in its extended position, the two angulated drive bars 76 lie generally beyond the outer side wall 46 of the conveyor 12 which is relieved at that location to accommodate the drive head 72. The stop 74, on the other hand, projects laterally over the outer portion of the carpet 44, terminating about midway between the two side walls 46.

A circular part D which is placed on the feed end of the carpet 44, with its lower end face 8 against the carpet 44, will advance under the vibratory action of the carpet 44 until it strikes the stop 74 of the drive head 72. When the servomotor 60 of the loading unit 14 is thereafter energized, it moves the slide 54 inwardly toward its retracted position. As the slide 54 moves out of its extended position, its drive head 72 cradles the circular part D between the two angulated drive bars 76 and centers it laterally with respect to the measuring axis Z. The part D slides over the vibratory carpet 46, across the loading deck 32, and onto the elevating unit 16 which provides a supporting surface in the aperture 36. The encoder 64 monitors the movement of the part D, and the computer C stops the motor 64 when the axis X of the part D coincides with the measuring axis Z. In this regard, the machined diameter of the part D is introduced into the computer C, thus enabling the computer C to calculate the distance the slide 54 must be retracted to bring the axis X of the part D into alignment with measuring axis Z. Actually, the two axes X and Z need not be precisely aligned, for an offset of a few thousandths of an inch can be tolerated and is to be expected.

The loading unit 14 serves to transfer the part D from the conveyor 12 to the elevating unit 16 which is attached to the loading deck 32 generally beneath aperture 36 in that deck. The elevating unit 16 includes (FIGS. 7-9) a base 80 which is secured firmly to the underside of the loading deck around the aperture 38 and has upon it a slideway 82 (FIG. 9) which is parallel to the measuring axis Z and hence perpendicular to the loading deck 32. The slideway 82 in turn receives a slide 84 which is capable of moving vertically along the slideway 82 parallel to the measuring axis Z in the total absence of lateral free motion. At its upper end the slide 84 carries a rotary table 86 (FIGS. 2, 7 & 8) having an upwardly presented circular platen 88 that is only slightly smaller in diameter than the aperture 36 in the loading deck 32. Indeed, when the part D is withdrawn from the conveyor 12, the circular platen 88 occupies the aperture 36, its upper surface lying flush with the upper surface of the loading deck 32, but irrespective of the position of the slide 84 along the slideway 82, the center of rotation for the rotary table 86 and the center of its circular platen 88 are coincident with the measuring axis Z. The platen 88 has three radially directed slots 89 (FIGS. 2 & 4) which emanate from the measuring axis Z and are spaced apart at 120° intervals.

To move the slide 84 upwardly and downwardly on the slideway 82, the base 80 is fitted with a drive rod 90 (FIGS. 7-9) which extends parallel to the slideway 82 and at its ends turns in antifriction bearings 92, at least some of which are capable of taking thrust loads in both directions as well as radial loads. Two tapered roller bearings mounted in opposition to each other are suitable for this purpose. The drive rod 90, which has a smooth exterior surface, extends substantially the entire length of the base 80 and at its lower end is coupled to a servomotor 94 through a timing belt and pully drive 96. The servomotor 94 is likewise mounted on the base 80 and is reversible, its operation being controlled by the computer C.

Figure 7:
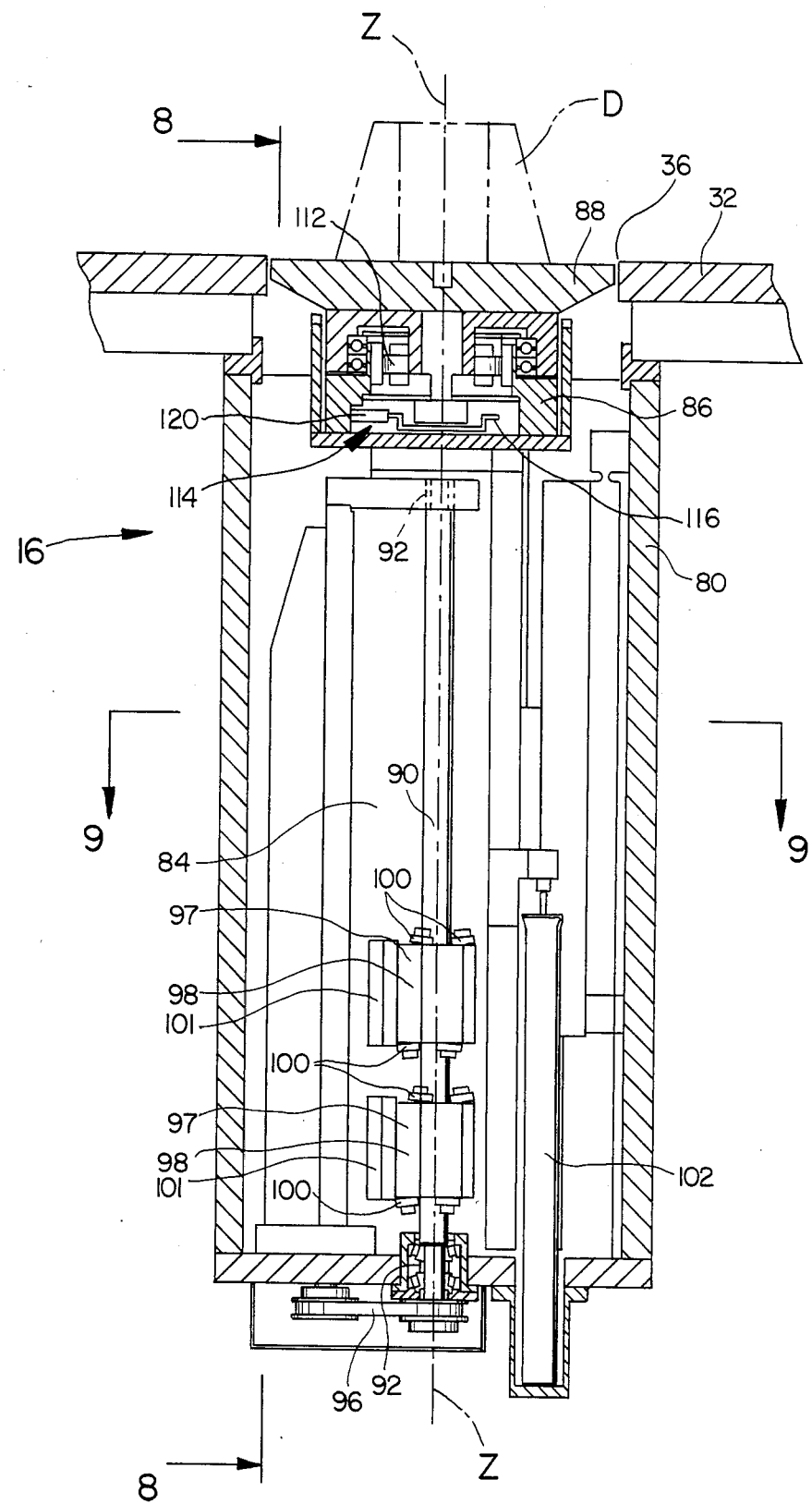
FIG. 7 is a sectional view taken along 7—7 of FIG. 4 and showing the elevating unit.
Figure 8:
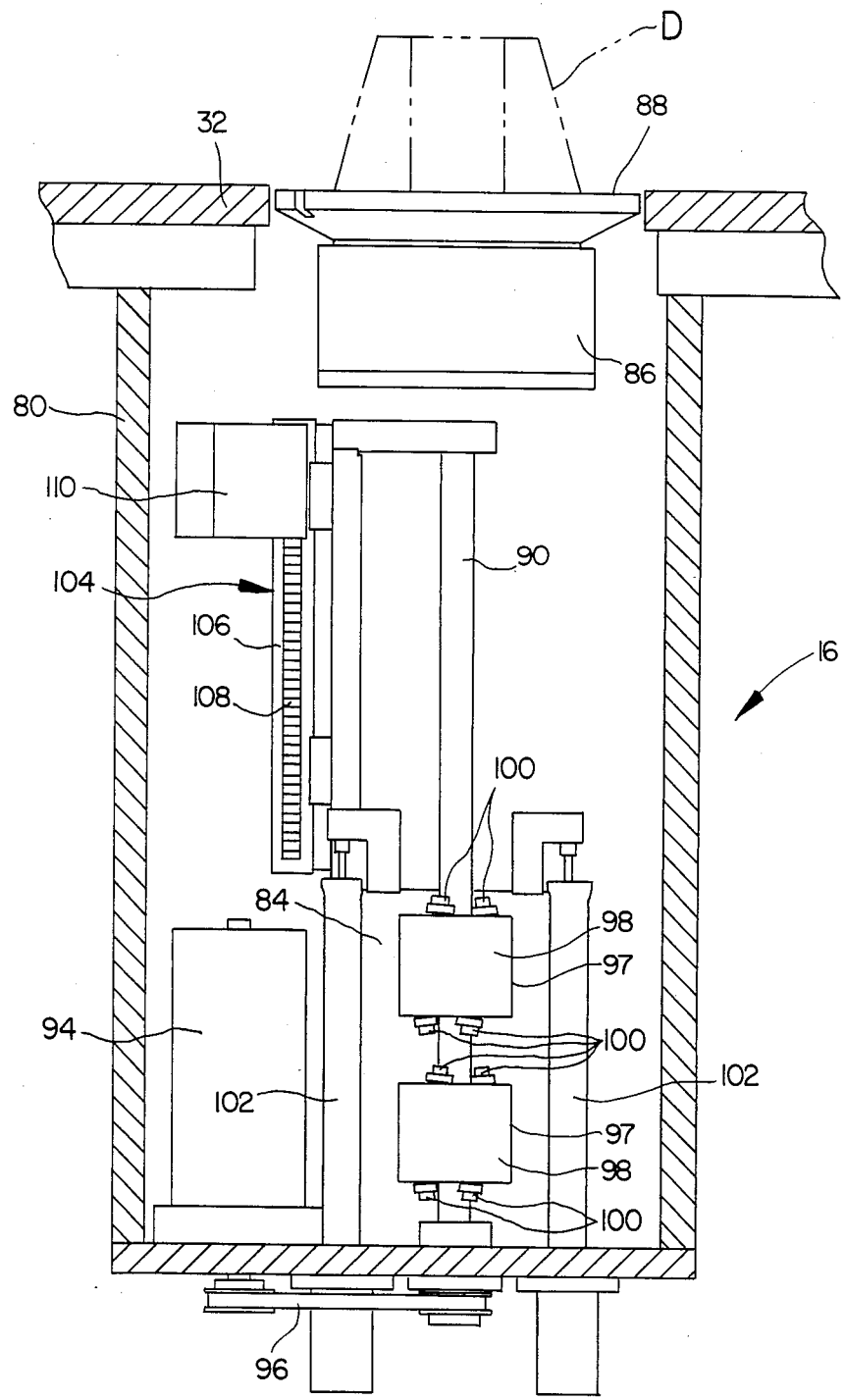
FIG. 8 is a sectional view of the elevating unit taken along line 8—8 of FIG. 7.
Figure 9:
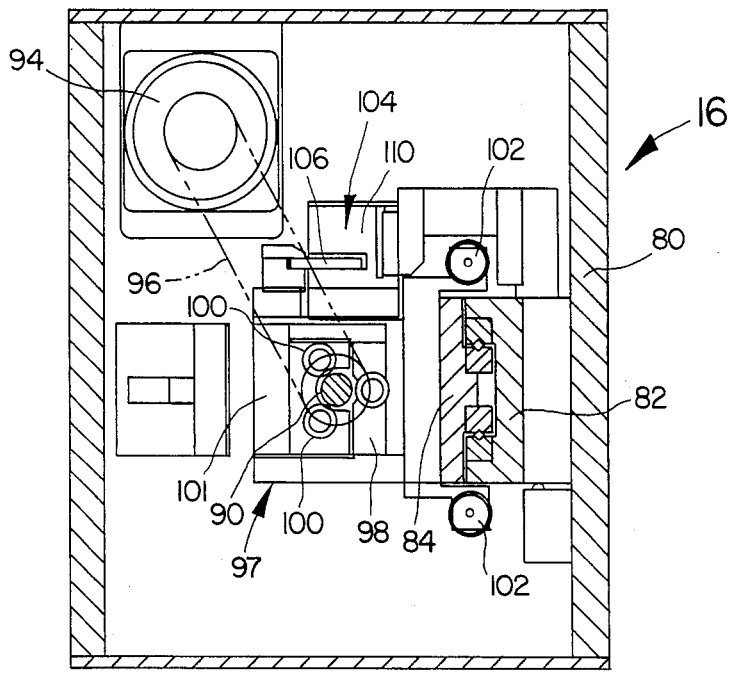
FIG. 9 is a sectional view of the elevating unit taken along line 9—9 of FIG. 7.

The drive rod 90 couples with the slide 84 through one of two friction drives 97 (FIGS. 7-9). Each friction drive 97 includes a split follower block 98 which is secured to the slide 82 and possesses a bore through which the rod 90 passes. At each of its ends the block 98 is fitted with a set of three rollers 100, and if the block 98 is transmitting a driving force these rollers bear against the cylindrical side face of the rod 90 and rotate with the rod 90 as the rod 90 turns. The rollers 100 of each set are arranged symetrically about the rod 90, that is at 120° intervals, but their axes are not parallel to that of the rod 90. Instead the roller axes are skewed slightly with respect to the rod axis, and as a result the follower block 98 moves along the rod 90 when the rod 90 turns, the direction of movement of course being dependent on the direction of rotation for the rod 90. Since the follower blocks 98 are bolted to the slide 84, the slide 84 likewise moves upwardly or downwardly with the block 98, carrying the table 86 with it. The slide 84 follows the slideways 82 and since they are parallel to the measuring axis Z, the center of the table 86 and its platen 88 remain coincident with the measuring axis Z, irrespective of the position of the slide 84 along the slideway 82.

The angular offset or pitch for the rollers 100 of one block 98 is greater than that of the rollers 100 for the other block 98. For example, the rollers 100 of the upper block 98 may be inclined to provide a pitch of 0.032 inches, meaning that for every revolution of the shaft 90 the block 98 which carries those rollers 100 will advance 0.032 inches (0.812 mm.), whereas the rollers 100 for the lower block 98 may be positioned to provide a pitch of 0.200 inches (5.08 mm.). Moreover, each block 98, being split, is segmented into two components. One of the rollers 100 for each set is carried on one of those components, while the other two rotate on the other component. Each block 98 carries a pneumatic device 101 which when energized urges the two components of the block 98 together and of course this causes the rollers 100 of the block 98 to grip the shaft 90. On the other hand, when the pneumatic device 101 is deenergized the components of its block 98 separate and the rollers 100 relax their grip on the shaft 90. As a consequence, the shaft 90 will merely slide through the block 98. The pneumatic device 101 of one or the other of the blocks 98 is always energized so that the slide 84 will advance at the greater speed imparted by the high pitch rollers 100 or the lesser speed imparted by the low pitch rollers 100.

Zero-Max of Minn., Minnesota, under the trademark ROH'LIX sells a friction drive, which with a slight modification, is suitable for use as the friction drives 97. That drive employs springs for urging the components of its split blocks together. The modification involves substituting the pneumatic device 101 for the springs so as to control whether the drive 97 will be active or inactive.

The friction drives 97 have very little backlash and thus can position the table 86 along the measuring axes Z with considerable precision. Moreover, they will slip on the shaft 97 if overloaded, and as such offer crash protection. Thus, if the table 86, as it moves along the axes Z, encounters an obstacle which prevents further movement, the slide 84 and its slideway 82 as well as the motor 94 and drive 96 will not be damaged.

The slide 84 and its rotary table 86 possess considerable weight, and to offset this weight the base 80 is fitted with pneumatic counterbalances 102 (FIGS. 7-9), each having a connecting rod which is attached to the slide 84. The counterbalances 102 in effect maintain the slide 84 in a substantially weightless condition, so that the drive rod 90 acting through the skewed rollers 100 for one friction drive 97 exerts very little force to move the slide 84 either upwardly or downwardly. Suitable for use as each counterbalance 102 is an AIRPOT actuator marketed by Airpot Corporation of Norwalk, Conn.

The servomotor 94 which moves the slide 84 and its table 86 operates under the control of the computer C, and to enable the computer C to monitor the position of the table 86, the elevating unit 16 is provided with its own linear encoder 104 (FIG. 8). Like the encoder 64, the encoder 104 includes a glass scale 106 having a grating 108 on it and a transducer 110 which in effect reads the grating 108. The scale 106 is attached to the slide 84 with the surface that carries the grating 108 being parallel to the slideway 82 and to the measuring axis Z as well. The transducer 110, on the other hand, is mounted on the base 80 where the scale 106 will pass by it as the slide 84 moves. The transducer 110 is connected to the computer C. The pitch of the grating 108 on the scale 106 may be as small as 10 microns (0.0004 in.), but by using circuitry to subdivide the grating 108, the vertical position of the table 86 can be resolved to less than 0.025 microns (0.000025 mm.) or one millionth of an inch.

The rotary table 86 contains its own servomotor 112 (FIG. 7) which drives its platen 88 such that the platen 88 will rotate about the measuring axis Z, and this motor 112 is likewise connected to and controlled by the computer C. Moreover, the computer C monitors the angular position of the platen 88 through a rotary encoder 114 including a circular glass scale 116 possessing a grating and a transducer 120 which in effect reads the grating on the scale 116. The circular scale 116 is attached to the platen 88 with its center on the measuring axis Z, while the transducer 120 is in effect fixed in position with respect to the slide 84. The table 86, including its motor 112, circular glass scale 116 and transducer 120, is available as a unit, one that is suitable being sold by Anorad Corporation of Haupauge, N.Y., as an ANOROUND rotary table.

The circular platen 88 of the rotary table 86 receives the circular part D that is to be measured and supports that part with its flat end face 8 against the platen 88 and its axis X generally coincident to the measuring axis Z. Indeed, with practically every circular part D the motor 94 is energized to move the table 86 upwardly and downwardly, and this enables measurements to be taken at a multitude of elevations along the part D. In addition, the motor 112 may be energized to rotate the platen 88, and this enables further measurements to be taken. When the measurements are completed, the computer C causes the servomotor 94 to position the slide 84 such that the upper surface of the circular platen 88 on the table 86 is again flush with the upper surface of the loading deck 32. This allows the discharge unit 24 to displace the measured part D from the platen 88 and return it to the conveyor 12.

Figure 10:
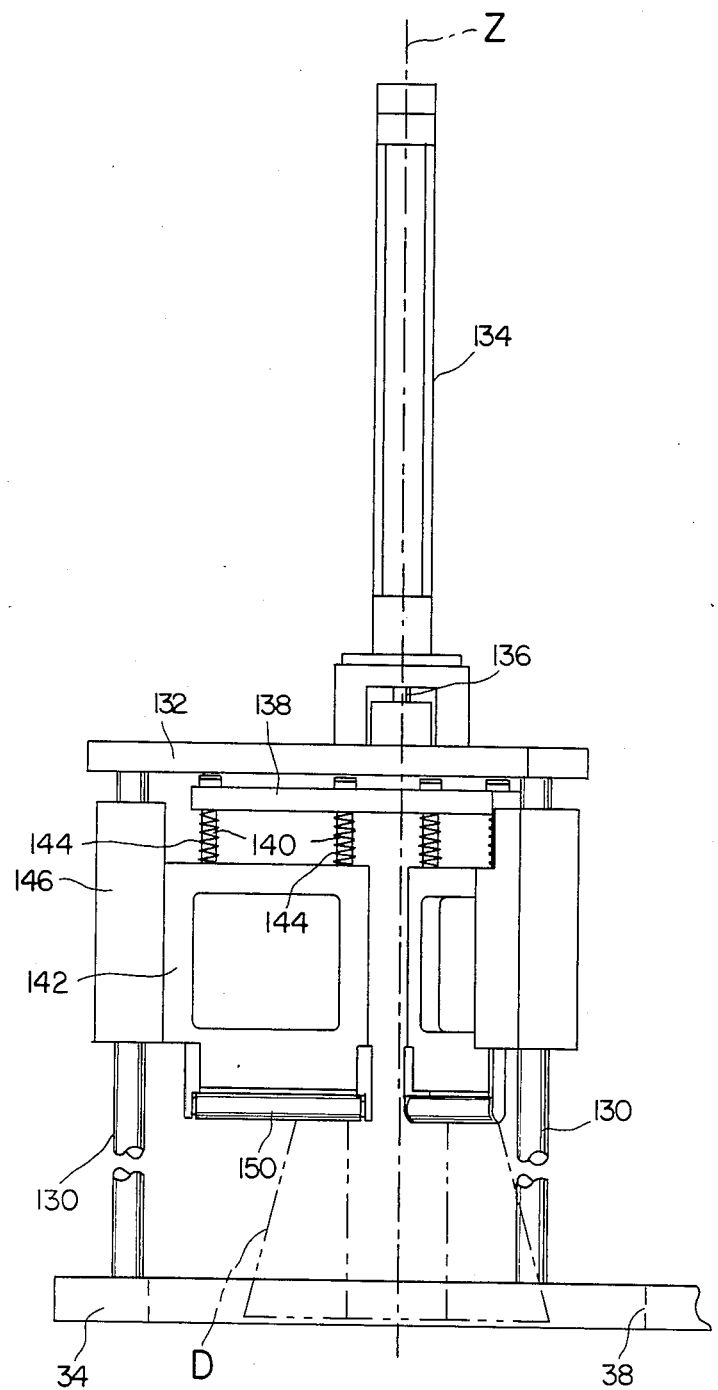
FIG. 10 is an elevational view of the clamping unit taken along line 10—10 of FIG. 1.

The clamping unit 18 (FIGS. 10 & 11) holds the circular part D against the circular platen 88 of the rotary table 86 while the three measuring heads 20 produce a multitude of measurements. Although the unit 18 exerts a downwardly directed force on the part D, it nevertheless does not prevent the elevating unit 16 from moving the part D upwardly and downwardly, nor does it prevent the unit 16 from rotating the part D. The clamping unit 18 includes three cylindrical rods 130 which at their lower ends are secured to the measuring deck 34 around the circular aperture 38 in that deck, with each rod 130 being centered intermediate a pair of measuring heads 20. The rods 130 rise vertically above the measuring heads 20 and at their upper ends are secured to a mounting plate 132, thus supporting the plate 132 in an elevated position above the measuring deck 34. The plate 132 in turn serves as a mount for a double acting pneumatic cylinder 134, the barrel of which is fixed firmly to the plate 132, its axis being coincident to the measuring axis Z. The cylinder 134 has a rod 136 which projects downwardly through the plate 132, it likewise being along the measuring axis Z, and at its lower end is attached to a horizontal spider 138 provided with three arms which radiate toward the vertical rods 130. Thus, pressurized air admitted to the barrel of the cylinder 134 will cause the spider 138 to move upwardly or downwardly along the measuring axis Z. Each arm of the spider 138 is provided with two loosely fitted pins 140 which at their lower ends are threaded into clamping brackets 142. While the pins 140, by reason of their loose fit, are capable of sliding upwardly and downwardly in the spider 138, they do have heads at their upper ends which prevent them and the brackets 142 which they carry from dropping away from the spider 138. Indeed, each pin 140 is encircled by an coil-type compression spring 144 which urges the bracket 142 to which it is attached downwardly away from the spider 138. The three brackets 142 align with the three rods 130 in the sense that they are for the most part located directly inwardly from such rods 130, and each at its outer edge has a sleeve 146 through which the rod 130 with which it aligns extends. The sleeves 146 contain ball bushings which follow the rods 130 so that the rods 130 guide the brackets 142 in the vertical direction. Each bracket 142 at its lower end is fitted with a clamping roller 150 which revolves about a horizontal axis, and indeed all three roller axes intersect at a common point which is along the measuring axis Z.

Initially the rod 136 of the pneumatic cylinder 134 is retracted, but once the loading unit 14 places a circular part D on the platen 88 of the elevating unit 16, pressurized air is directed to the cylinder 134, causing it to extend its rod 134 and thereby lower the spider 138. As the spider 138 descends, the brackets 142 follow the vertical rods 130 until the clamping rollers 150 bear against the upper end face 6 of the part D. The cylinder 134 continues to extend its rod 136, and as a consequence the pins 140 slide through the downwardly moving spider 138, while the springs 144 compress between their brackets 142 and the spider 138. Indeed, the piston rod 136 extends until a predetermined pressure develops within the barrel of the cylinder 134, and that pressure offsets the cummulative force exerted on the part D by the compressed springs 144. This is, of course, the force which the rollers 150 apply to the part D to hold it against the platen 88 of the elevating unit 16.

Figure 2:
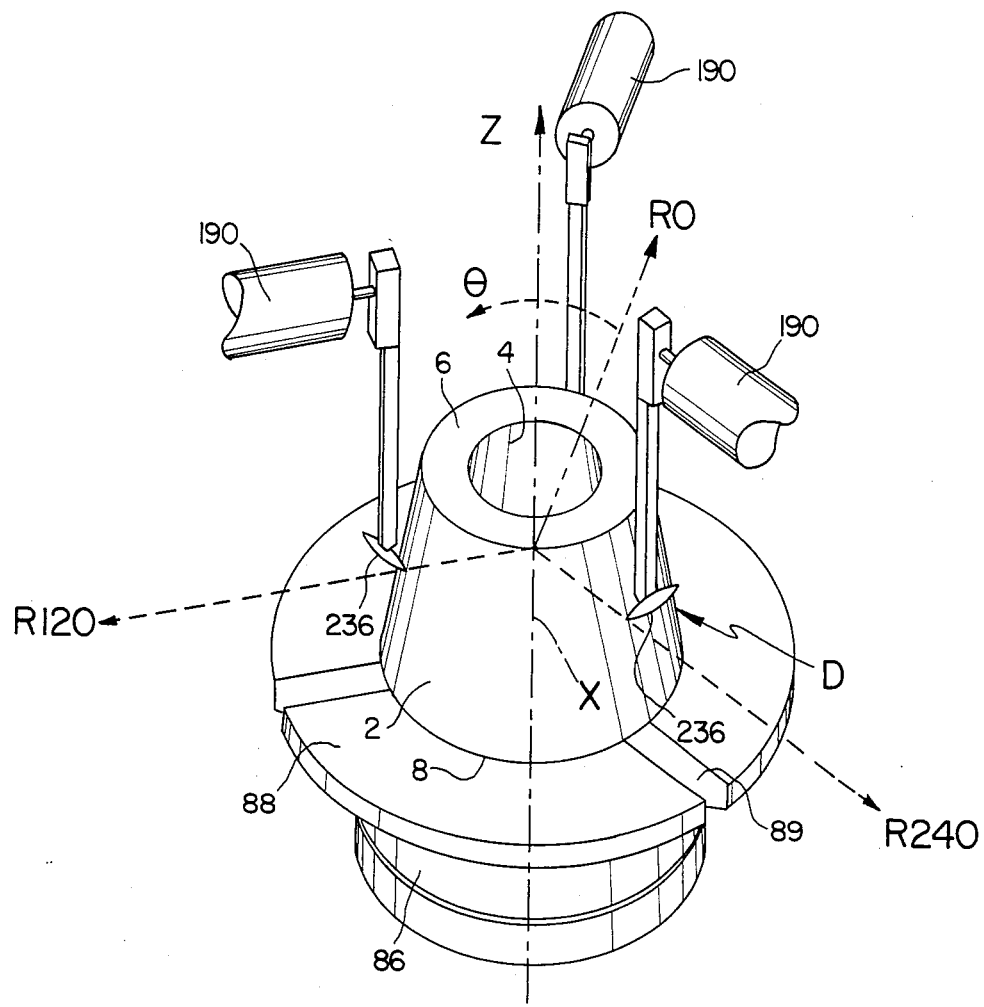
FIG. 2 is a perspective view showing a circular object supported on the elevating unit of the machine while probe arms of the three measuring heads bear against the side face of the object to obtain measurements from that side face.

The three measuring heads 20 are arranged around the circular aperture 38 in the measuring deck 34 and make their measurements along three different measuring radii R0, R120 and R240 which emanate from the measuring axis Z (FIGS. 2 & 11). Indeed, the heads 20 are positioned such that the measuring radii R0, R120 and R240 are symmetrical about the measuring axis Z, that is spaced at 120°, and also such that the brackets 142 of the clamping head 18 are aligned with the open spaces between the three heads 20. Thus, neither the brackets 142 nor their clamping rollers 150 interfere with the measuring heads 20 as they perform their measurements along the three radii R00, R120 and R240. Moreover, each of the heads 20 performs its measurements at the same elevation, which is slightly above the upper surface of the measuring deck 34. The elevation of the three heads 20 remains the same, for the elevating unit 16 moves the part D vertically along the measuring axis Z, thus enabling the measuring heads 20 to perform radial measurements at different locations along the axis X of the part D.

Figure 12:
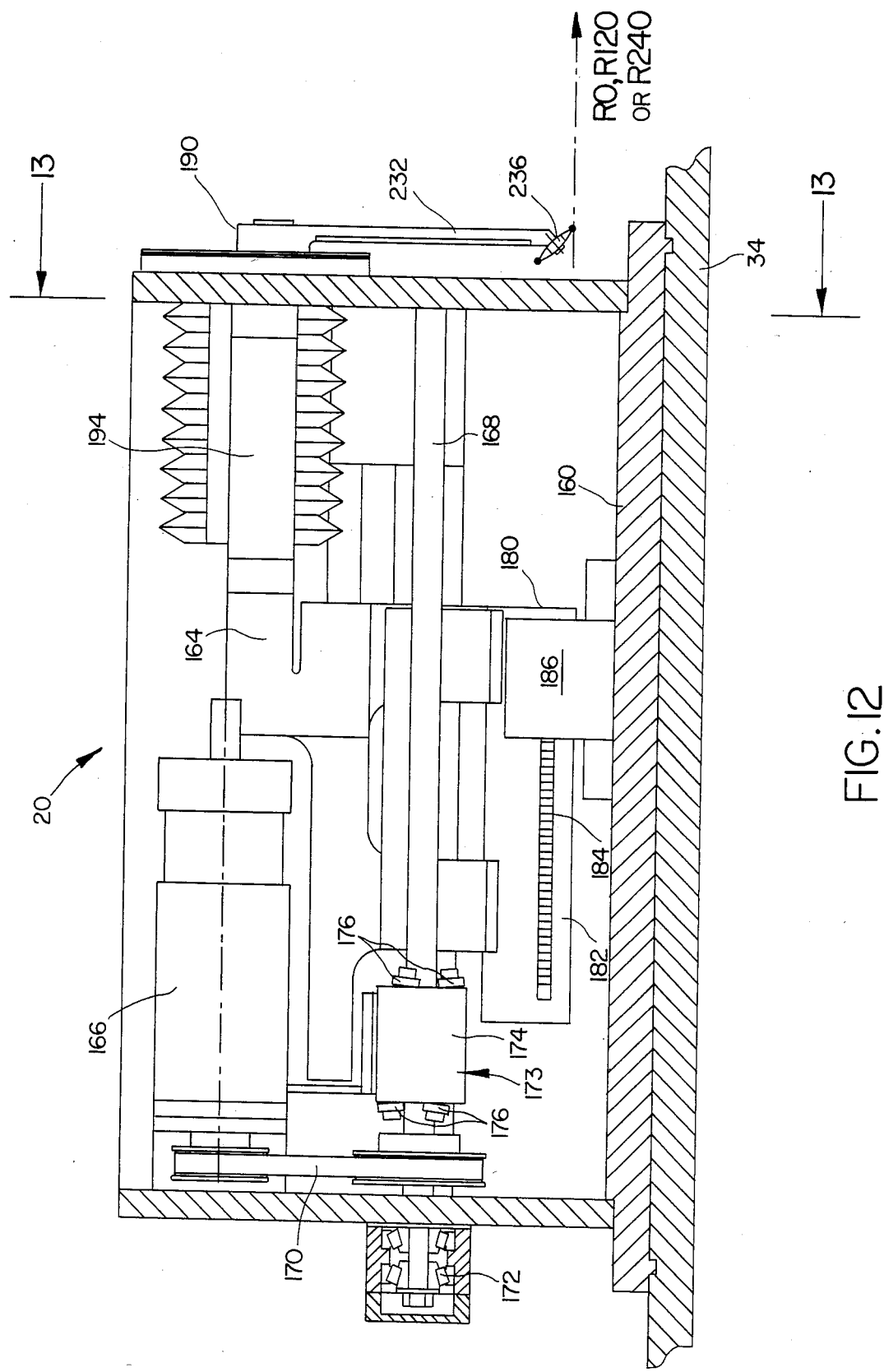
FIG. 12 is a sectional view of one of the measuring heads taken along line 12—12 of FIG. 11.
Figure 13:
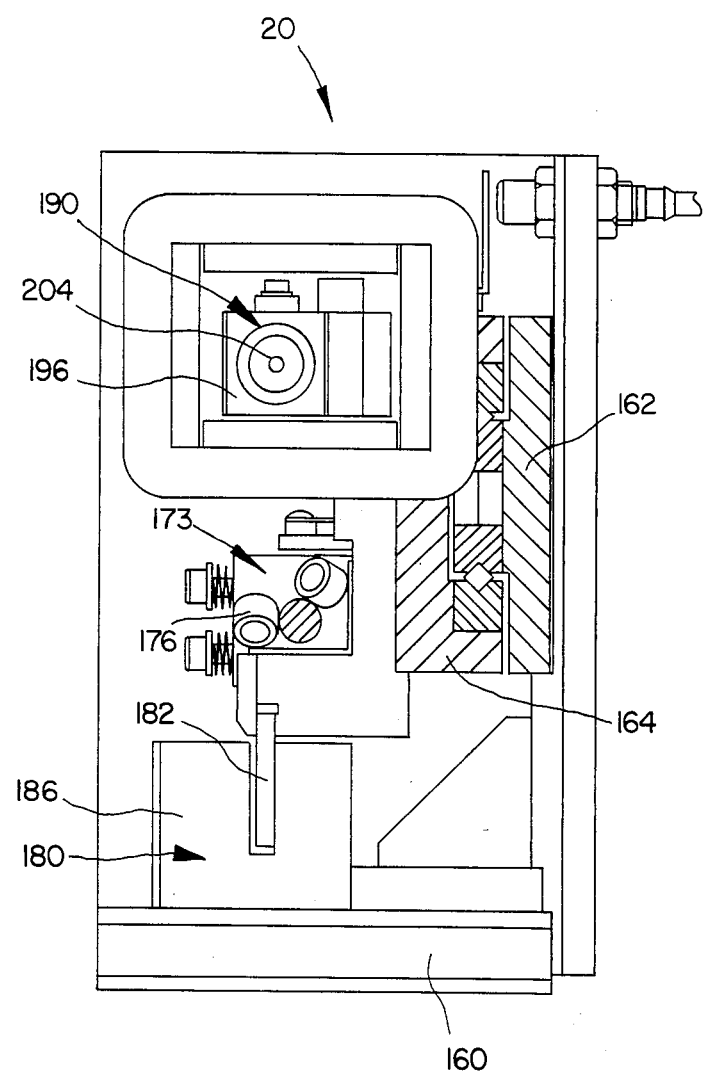
FIG. 13 is a transverse sectional view of the measuring head taken along line 13—13 of FIG. 12.

The three measuring heads 20 are essentially the same, except of course for location on the deck 34, and each includes (FIGS. 12 & 13) a base 160 which is attached firmly to the upper surface of the measuring deck 34 and has a slideway 162 extending over it, the slideway 162 being parallel to the particular measuring radius r along which the head 20 is located. The base 160 carries a slide 164 which moves along the slideway 162, and thus moves radially toward and away from the measuring axis Z. This movement is effected by a reversible servomotor 166 which is attached to the base 160 and is coupled to a drive rod 168 through a timing belt drive 170 located at the remote end of the head 20, that is at the end located away from the circular aperture 38. The rod 168 has a smooth exterior surface that is cylindrical and at its ends turns in bearings 172 which are within the base 160, its axis of rotation being parallel to the slideway 162. Moreover, the bearings 172 at the remote end of the rod 168 are capable of accommodating thrust loading as well as radial loading—indeed without any lost motion in the axial direction. To this end two indirectly mounted tapered roller bearings adjusted to a condition of slight preload are best suited for the bearings 172 at this location. Tee drive rod 168 is coupled to slide 164 through a friction drive 173 which is similar to either one of the friction drives 97, except that it does not have a pneumatic actuator. As such, the friction drive 173 includes a split follower block 174 which is mounted on the slide 164 and contains a bore through which the drive rod 168 passes. At each of its ends the block 174 is fitted with three rollers 176 which are arranged symmetrically around the rod 168 and bear against its smooth cylindrical surface. One of the rollers 176 of each set is on one-half of the split block 174, while the remaining two are on the other half, and the two halves are urged together by springs which cause all three rollers 176 to grip the cylindrical surface of the rod 168. The axes of the rollers 176 are skewed slightly with respect to the axis of the drive rod 168, and as a consequence the block 174 will move along the rod 168 as the rod 168 rotates. The slide 164, being attached to the follower block 174, moves along the slideway 162 on the base 160, the direction of movement being dependent on the direction of rotation for the rod 168.

The computer C monitors the position of the slide 164 along the measuring radius r for the head 20, which is in effect its distance from the measuring axis Z, and this monitoring is achieved through a linear encoder 180 (FIG. 12) similar to the encoder 104 that monitors the vertical position of the table 86 for the elevating unit 16. As such the encoder 180 includes a glass scale 182 which is attached to the slide 164 near the measuring deck 34 and is provided with a grating 184, that is located essentially at the same elevation at which the head 20 makes its radial measurements. The grating 184 consists of a succession of closely spaced vertical lines which lie in an array that extends parallel to the slideway 162. In addition, the encoder 180 includes a transducer 186 which is located on the base 160 along the scale 182 where it projects a beam of light onto the grating 184. The transducer 186 also includes a photodetector which senses interruptions caused in the light beam by the lines of the grating 184. In effect, the transducer 186 counts the lines on the grating 184 to determine the position of the slide 164 along its measuring radius r. The transducer 186 is connected with the computer C as is the servomotor 166.

Figure 14:
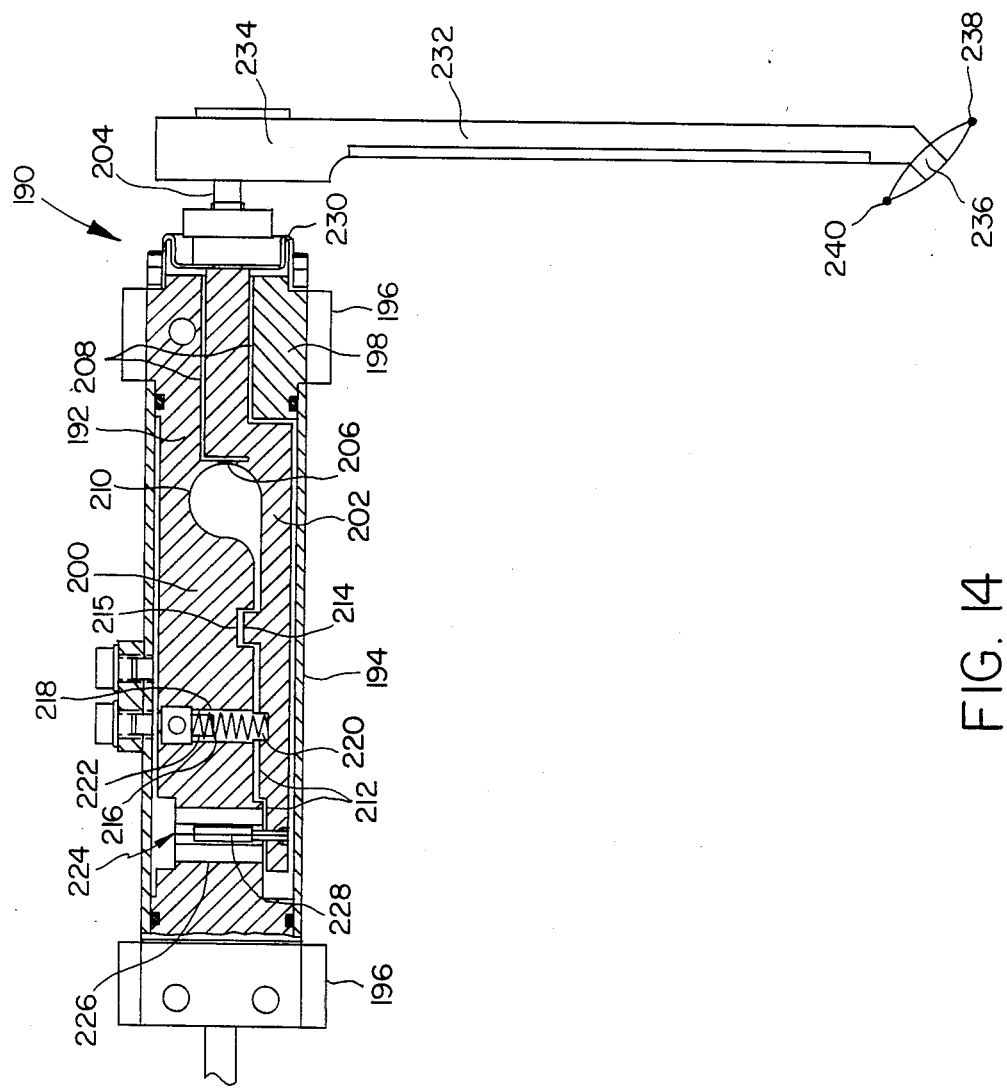
FIG. 14 is a sectional view of the probe for one of the measuring heads.

The radial measurements which are performed at the measuring head 20 are effected by actually contacting the part D as it is supported on the rotary table 86 of the elevating unit 16, and this contact occurs at a measuring probe 190 (FIG. 14) which is carried by the slide 164. The probe 190 includes a main body 192, which is for the most part enclosed within a cylindrical case 194, and at its ends is fitted with front and rear mounting blocks 196 through which the probe body 192 is secured firmly to the slide 164 of the measuring head 20. At the rear mounting block 196 the body 192 is cylindrical and is fitted with an 0-ring to effect a fluid-tight seal with the case 194. At its forward end, the probe body 192 is semicylindrical, but mates with a closure 198 of semicylindrical configuration. Both accommodate an O-ring and effect a fluid-tight seal with the case 194. The closure 198 is further confined within the front mounting block 196.

Although the main body 192 is machined from a single piece of steel, it has two sections 200 and 202, the latter of which is capable of moving relative to the former. Actually, the section 200 is secured to the mounting blocks 196 and is therefore fixed firmly in position with respect to the slide 164. It occupies generally the upper half of the cylindrical case 194. The other section 202, which occupies generally the lower half of the case 194, projects forwardly along the axial centerline of the case and extends beyond the front mounting block 196 in the form of a deflecting spindle 204. The two sections 200 and 202 are joined along a connecting section or flexure 206 which, being quite thin, enables the section 202 to pivot relative to the fixed section 200, and this movement manifests itself in a slight vertical displacement of the spindle 204, specifically the forward end of the spindle 204. To accommodate this movement, a slight clearance 208 exists between the spindle 204 and that portion of the fixed section 200 which overlies it, and another slight clearance 208 exists between the spindle 204 and the closure 198 which lies beneath it. Also, directly behind the flexure 206 a relatively large almost circular cutout 210 exists in the main body 192 to separate the two sections 200 and 202, and this cutout 210 merges into another slot-like clearance 212 which extends rearwardly to the end of movable section 202. The clearance 212, however, is interrupted by a boss 214 which projects from the lower portion of the movable section 202 into a downwardly opening cavity 215 in the fixed section 200 to protect the flexure 206 should an inadvertent load be applied to the end of the spindle 204, thus providing crash protection.

The main body 192 is constructed such that the rear end of the movable section 202 is biased toward the fixed section 200 unless urged away from the fixed section 200 by an opposing force. That force is provided by a coil-type compression spring 216 which for the most part fits into a bore 218 within the fixed section 200, but at its lower end is received in a socket 220 within the movable section 202. The bore 218 also contains a set screw 222 which is turned down against the spring 216 to maintain the clearance 212 throughout the full length of the movable section 202. Thus, the spindle 204 may be displaced downwardly, in which case the displacing force acts against the compression spring 216, or it may be displaced upwardly, in which case the force acts against the natural bias of the steel from which the main body 202 is formed. Either way, the movement is quite limited and indeed restricted, for the movable section 202 will strike either the fixed section 200 or the surrounding case 194, thus providing additional crash protection.

To sense movement between its two sections 200 and 202 and thus detect a vertical displacement of the spindle 204, the main body 192 of the probe 190 is fitted with linear variable differential transformer or LVDT 224, including a hollow coil 226 which is housed in the fixed section 200 directly over the rear end of the movable section 202. Here the movable section 202 is fitted with a core 228 which projects upwardly into the hollow interior of the coil 226. Any vertical displacement of the spindle 204 translates into an axial displacement of the core 228 within the coil 226, and this causes the coil 226 to produce an electrical signal which is detected in circuit boards to which the coil 226 is connected, those boards being in the enclosure E. LVDTs suitable for use as the LVDT 224 in the probe 190 are available from Schaevitz of Pennsauken, N.J.

The interior of the cylindrical case 194 is filled with a lightweight oil which serves to quickly damp any vibrations that may develop in the movable section 202 of the main body 192 when its spindle 204 is displaced in either direction. The O-ring seals at the end of the case 194 serve to retain this oil within the case 194, as does an elastomeric diaphragm seal 230 which is seated against the front mounting block 196 and against the spindle 204.

In addition to the main body 192 and its case 194 and LVDT 224, the probe 190 includes a probe arm 232 which is attached to the spindle 204 on the movable section 202 of the main body 192 and projects downwardly from it toward the measuring deck 34. At its upper end the arm 232 is provided with a clamp block 234 which clamps securely around that portion of the spindle 204 which projects out of the case 194. The lower end of the probe arm 232 lies slightly above the measuring deck 34 at about the same elevation as the grating 184 on the glass scale 182 of the linear encoder 180 for the measuring head 20, and here the arm 232 is fitted with a tip 236 having front and rear contact points 238 and 240 which are essentially small spheres, typically about 1/32 inches (0.793 mm.) in diameter, although the size and relative location depends on the gauging application. While the two contact points 238 and 240 lie beyond front and rear surfaces of the arm 232, they are not at the same elevation, but instead the rear contact point 240 is slightly higher than the front contact point 238. It is along the contact points 238 and 240 that the probe 190 actually contacts the part D that is measured. In this regard, the front contact point 238 is used against circular surfaces that are presented away from the measuring axis Z, that is to say outer surfaces, such as the tapered face 2 of the part D, (FIG. 2), and also against upwardly presented end surfaces, such as the end face 6. The rear contact surface 240, on the other hand, is used against surfaces that are presented inwardly toward the axis Z, such as the cylindrical face 4 of the part D and also against downwardly presented surfaces such as the end face 8.

When either contact point 238 or 240 comes against a surface which is to be measured, the tip 236 is deflected laterally, but the arm 232 and spindle 204 actually pivot about the flexure 206 of the main body 192, causing the rear end of the movable section 200 to likewise move, either toward the fixed section 200 or away from it, against a spring bias. Irrespective of the direction of the displacement, the core 228 of the LVDT 224 shifts within the coil 226, thereby developing an electrical signal which correlates to the direction of the movement as well as the magnitude of the displacement.

Actually the displacement of the probe tip 236 causes the LVDT 224 to produce a voltage which relates in magnitude to the magnitude of the displacement. The linear encoder 180 for the measuring head 20 serves as the reference by which the LVDT 224 is calibrated. To this end, the probe tip 236 for each probe 190 is brought against a fixed surface and then driven inwardly, all with the servomotor 166 for the measuring head 20 in which the probe 190 is located. The displacement of the probe tip 236 as measured by the linear encoder 180 is compared with the voltage derived from the LVDT 224 as a result of that displacement, thus producing a correlation between the two which in effect establishes the calibration for LVDT 224.

The servomotor 166 for the slide 164 and the LVDT 224 for the probe 190 are electrically connected together through a feedback loop such that the motor 166 seeks to drive one of the contact points 238 or 240 against the surface that is to be measured, but only to the extent that the tip 236 is displaced by a predetermined amount, 0.005 inches (0.127 mm.) for example. Since the encoder 180 measures the position of the slide 164 relative to the measuring deck 34 and the measuring axis Z as well, and the probe 190 measures the position of the tip 236 relative to the slide 164, the computer C determines the actual position of the tip 236 relative to the measuring axes Z by algebraically adding the position of the slide 164, which is reflected in the reading from the encoder 180, and the position of the probe tip 236, which is reflected in the reading for the LVDT 224. When the elevating unit 16 changes the elevation of the table 86, that contact point 238 or 240 which is against the surface part D remains against the part D and small variations in profile are detected through the LVDT 224, for the movable section 202 of the main body 192 and the probe arm 232 have relatively little inertia and can follow such variations in the surface of the part D. If the variation becomes substantial, the error signal which is sent through the feedback loop causes the motor 166 to move the heavier slide 164, the arrangement being such that the motor 166 always attempts to position the slide 164 so that the predetermined deflection exists at the tip 236 of the probe arm 232.

Since the probe tip 236 with its contact points 238 and 240 exists at essentially the same elevation as the grating 184 on the glass scale 182, so-called ABBE error or ABBE offset is minimized, and compensation for it is unnecessary.

When determining the radius R and axial profile of circumferential surfaces, such as the tapered face 2 and the cylindrical face 4 of the part D, the probe tips 136 of all three measuring heads 20 contact the part D concurrently along the particular surface that is being measured and follow the part D, that is remain in contact with it, as the part D moves along the measuring axis Z under the motion imparted to the table 86 by the motor 94. At periodic intervals, typically 0.005 inches (0.127 mm.), each measuring head 20 provides a reading representing the radial location of its contact point 138 or 140 at the location where its tip 236 actually contacts the part D, and this reading of course represents the algebraic sum of the position of the slide 164 as determined by its encoder 180 and the deflection of the probe tip 236 as determined by the LVDT 224 within the probe 190 itself. At any particular location where the simultaneous readings are taken along the measuring axis Z, the radius R of the part D at that location may be expressed as the average of the radii measured by the three measuring heads 20, and that average is represented by the following formula:

$$R = \frac{R0 + R120 + R240}{3}$$

where R0, R120 and R240 are the different radii measured by the three heads 20.

Better still, the calculated radius R, along with the location of its center in the coordinate system of FIGS. 2 and 11, may be derived from a best fit circle algorithm. That algorithm calls for the calculation of two intermediate values T1, T2, x and y using the symbols A1, B1, A2, B2, A3, and B3 where:

$$A1 = R0$$
$$B1 = 0$$
$$A2 = -R120 \sin 30°$$
$$B2 = -R120 \cos 30°$$
$$A3 = -R240 \sin 30°$$
$$B3 = R240 \cos 30°$$

$$T1 = \frac{A3^2 - A2^2 + B3^2 - B2^2}{2(B3 - B2)}$$

$$T2 = \frac{A3 - A2}{B3 - B2}$$

Having determined T1 and T2, it is possible to calculate x and y:

$$x = \frac{A1^2 - A2^2 + B1^2 - B2^2 - 2T1(B1 - B2)}{2[A1 - A2 + T2(B2 - B1)]}$$

$$y = T1 - xT2$$

The radius R of the best fit circle is:

$$R = [(A1 - x)^2 + (B1 - y)^2]^{\frac{1}{2}}$$

Actually x and y represent the center of the best fit circle in a Cartesian or rectangular coordinate system in which the x and y axes lie in a plane perpendicular to the measuring axis Z and indeed intersect at the measuring axis Z, with the X axis (not to be confused with the axis X of the part D) coinciding with R0 and the Y axis being offset 30° from R240. Since the coordinates x and y of the center are known, it is possible to convert to the coordinate system of FIGS. 2 and 11 in which the center is expressed as a distance RC from the measuring axis Z and as an angle θ C from the radial line RO.

Since the radius R represents an average or the radius of a best fit circle, depending on which forumala is used, it is accurate even though the axis X of the part D may be offset slightly from the measuring axis Z. The particular elevation at which each set of three simultaneous radial readings are taken by the measuring heads 20 is determined by the linear encoder 104 for the elevating unit 16, and the computer C correlates that elevational reading with the average radius R that it computes from the three radial readings. The calculated radius R and the elevation at which it exists are stored in the memory of the computer C.

Actually, the specific elevation at which each set of readings is taken may be referred to as a data set. For each data set seven readings are obtained simultaneously—namely a reading from each of the three linear encoders 180 for the measuring heads 20, a reading from each of the three LVDTs 224 of the probes 190, and a reading from the linear encoder 104 of the elevating unit 16. Each encoder 180, each LVDT 224, and the encoder 104 are identified with a separate circuit, and to effect concurrent readings, a strobe signal may be employed to command each of the seven circuits to provide a reading at the same instant.

Since each calculated radius R is an average or the radius of a best fit circle, the calculated radius R is further not affected by inaccuracies in the bearings along the slideway 82 of the elevating unit 16. Indeed, each calculated radius R is more accurate than the bearings of the slideway 82.

Figure 16A:
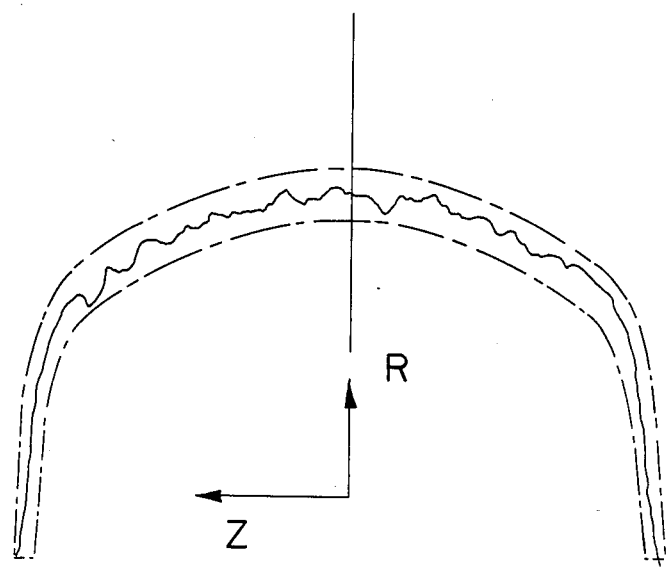
FIG. 16 a and 16b typical graphic displays derived from measurements taken by the machine.

From the numerous calculated radii R and the axial location of each such radii R, all of which are stored in the computer C, it is possible to determine the axial profile of the faces 2 or 4 along which the readings are taken, and this profile may be displayed on the CRT T of the computer C or may be plotted on paper through procedures that are quite conventional (FIG. 16a). Thus, it is possible to detect a taper in the faces 2 or 4 of the part D, convexity or concavity, or even undulations.

In addition, it is possible to determine from the succession of readings taken by the measuring heads 20 and the elevating unit 16, whether the axis X of the part D lies parallel to the measuring axis Z or is skewed with respect to it. This would indicate that the end face 8 on which the part D rests on the platen 88 is not square with respect to the axis X of the part. Indeed, it is possible to ascertain the deviation of the axis X from the measuring axis Z at each location along the axis Z where a set of readings is taken, that is to say at each data set. This is achieved by calculating the center of the best fit circle for each set of readings. This provides a series of points, and the locus of these points produces a trace which may deviate from the straight measuring axis Z.

While the measuring heads 20 make simultaneous readings at each successive location along the measuring axis Z, the elevating unit 16 does not pause at each location. Instead, its servomotor 94 continues to operate and advance the part D through the low pitch friction drive 97 as the readings are taken, and of course its encoder 104 provides the axial location of each set of three radial readings. Hence the radial measurements are in the form of a scan, and as a consequence, the entire measuring procedure, insofar as determining the radius or radii of the measured part D and its profile are concerned, consumes relatively little time. For example, the external radius and profile of a cylinder or cone 1 inch (25.4 mm.) high may be measured and determined in as little as 2 seconds. Moreover, the numerous readings statistically eliminate the significance of any one reading that may be caused by a minute surface abnormality. Inasmuch as the probe tips 236 actually contact the part D and move over one of its surfaces, they tend to displace contamination, and thus the machine A is much more tolerant of contamination on a measured surface than are machines which employ the touch-probe system.

The three probes 190 may be employed to make radial scans in addition to the axial scans previously mentioned. A radial scan would of course be appropriate for generally radially directed surfaces, such as the end faces 6 and 8 on the part D. For example, to determine the profile of the upper end face 6, the front or lower contact points 238 of the three probes 190 are brought against the end face 6 near its inner margin, and then the probe tips 236 are carried outwardly under a motion imparted by the servomotors 166 of the measuring heads 20. As the tips 236 move a series of readings are taken. In this instance the elevation of the surface at any location where a probe tip 236 lies is the algebraic summation of the vertical deflection of the probe tip 236 and the axial position of the rotary table 86 as measured by the linear encoder 104 of the elevating unit 16. The radial position at which elevational measurement is derived is obtained from the linear encoder 180 for the measuring head 20 which carries the probe tip 236. The servomotor 94 for the elevating unit 16 is connected through a feedback loop with the linear encoder 104 and LVDTs and seeks to maintain at the probe tips 236 an average deflection that is essentially constant. A radial scan of the lower end face 8 is made by positioning the probe tips 236 into the slots 89 of the platen 88 and bringing the rear or upper contact points 240 against the surface 8. Again the probe tips 236 under motion imparted by their servomotors 166 are moved radially over the surface 8 and a series of readings are taken. From these readings together with the radial locations at which they are made, the profile of the surface 8 is determined. The radial scans may be made with one or all three of the probes 190. The computer C stores the elevational measurements and the radial locations at which they are made, and from this information it is possible to obtain a graphic illustration of the profile, either on the CRT T or from a printer.

Figure 16B:
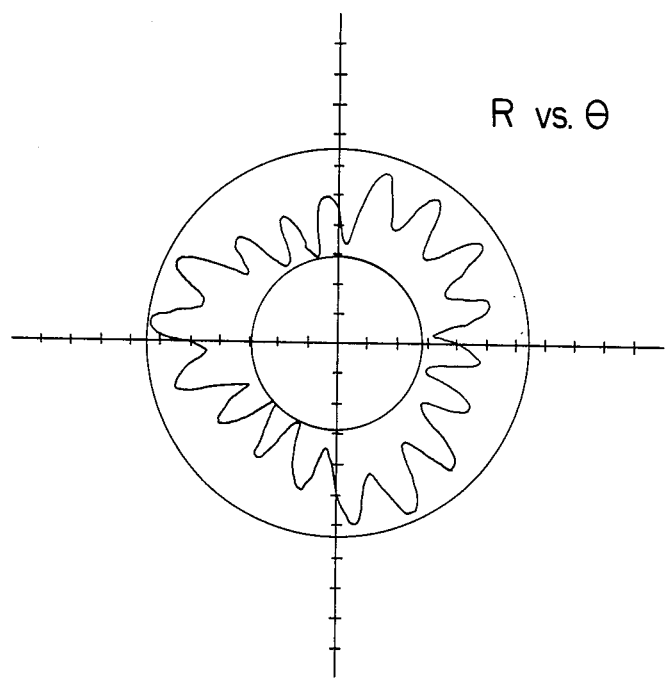

A single measuring head 20 is used to determine the circumferential contour of the part D or its deviation from round. In this case, the tip 236 of one of the probes 190 is advanced inwardly until it contacts the circumferential face 2 of the part D. Then the motor 112 of the rotary table 86 is energized to rotate the circular platen 88 as well as the part D which is held against the platen 88 by the clamping unit 18. Indeed, the rollers 150 of the clamping unit 18 merely roll over the upper end face 6 of the part D as the platen 88 and Part D revolve. The part D undergoes a single revolution, and as it does the probe tip 136 follows its outer face 2. Any deviations from a true circle are reflected in the measurements derived from the linear encoder 104 and the LVDT 224 which monitor the probe tip 136. Indeed, the computer C takes readings at closely spaced angular intervals, the angular location of each reading being determined from the rotary encoder 114 of the table 86. The computer C stores the measured radius R and the angular location $\theta$ of that radius in its memory and from the succession of measurements so performed, a graphic display may be obtained of the circumferential profile. That display may take the form of a CRT display or a print on paper (FIG. 16b). Thus, by rotating the part D with rotary table 86, it is possible to determine if the face 2 deviates from round or if it possesses lobes. The same type of analysis may be made along the inner face 4.

Closely related to detecting deviations from round, is the capability of centering the part D so that its axis X coincides precisely with the measuring axis Z. To this end, the part D is rotated on the table 86 with one of the probe tips 236 against its outside face 2. The computer A determines the high spot and then positions the part D so that the high spot is opposite the single probe tip 236. Then with the rollers 150 of the clamping unit 18 retracted from the part D, the servomotor 166 for the active probe 190 is energized to advance the probe tip 236 and thereby push the part D far enough to eliminate the high spot, or in other words bring its axis X to the axis Z. Then the part D is again rotated on the table 86 to insure that the high spot has been eliminated, and if it has not, the procedure is repeated. The automatic centering capability is particularly useful in centering the reference cylinder B with respect to the measuring axis Z. The measuring probes 190 and their tips 236 are sufficiently robust to allow the part D and the reference cylinder B to be centered without damage to them.

Also, the machine A determines deviation from flat for a surface that lies generally parallel to the platen 88, such as the end face 6 of the part D. In this case, the front or lower contact point 238 of a single probe 190 is brought against the face 6, and then the servomotor 112 of the table 86 is energized to rotate the part D. Elevational measurements are taken at circumferential intervals, these being derived from readings obtained from the LVDT 224 for the probe 190 and from the linear encoder 104 of the elevating unit 16. The angular location θ at which each elevational measurement is taken is, of course, obtained from the rotary encoder 114.

Turning now to the discharge unit 24 for displacing the part D from the platen 88 of the elevating unit 16, it includes a double acting pneumatic cylinder 250 (FIG. 4) which is mounted on the loading deck 32 with its axis parallel to the deck 32 and offset at about 45° with respect to the slideway 52 for the loading unit 14, but the axis intersects the measuring axis Z. The cylinder 250 includes a ram 252 which at its end is fitted with a drive head 254 having V-shaped face that is presented toward the measuring axis Z, its apex being along the axis of the pneumatic cylinder 250.

When the pneumatic cylinder 250 is energized, the ram 252 moves the head 254 over the platen 88 of the elevating unit 16 and thence over that portion of the deck 32 that lies between the elevating unit 16 and the conveyor 12. In so doing the head 254 comes against a part D on the platen 88 and displaces it toward the conveyor 12. Indeed, the part D moves over the deck 12 and onto the vibratory caret 44 of the conveyor 12, passing over the extended slide 54 and clearing the stop 74 of the loading unit 14 as it does. The ram 252 of course retracts after it has moved a part D from the platen 88 of the elevating unit 16 to the conveyor 12.

Figure 3:
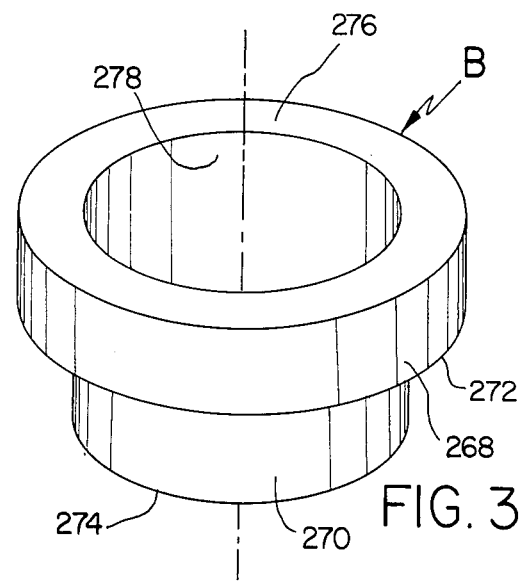
FIG. 3 is a perspective view of the reference cylinder from which the machine derives its calibration.

The carrier unit 22 loads the reference cylinder B onto the platen 88 of the elevating unit 16 and likewise retrieves it from that platen. It, like the discharge unit 24, is secured to the loading deck 32, but it is located on the other side of the elevating unit 16, generally above the slideway 52 and slide 54 of the loading unit 14. The carrier unit 22 includes a base 260 which is bolted to the loading deck 32 and a double acting pneumatic cylinder 262 which is mounted on the base 260 with its axis intersecting the vertical measuring axis Z. The cylinder 262 has a ram 264 which carries a fork 266 that is configured to hold the reference cylinder B. In this regard, the reference cylinder B has an external cylindrical surface 268 and pedestal 270 of lesser diameter, as well as a shoulder 272 between the two (FIG. 3). It also has two end faces 274 and 276 which are squared off with respect to the axis of the cylinder B, and a bore 278 which extends between the two end faces 274 and 276. The diameters of the external surface 268 and bore 278 are known as is the distance between the end faces 274 and 276, which is the height of the cylinder B. The height of the pedestal 270 is greater than the vertical dimension of the tines on the fork 266, so that when the cylinder B rests on a flat surface, such as the platen 88, the tines of the fork 266 may be inserted under its shoulder 272.

Indeed, when the reference cylinder B is not in use it is stored on the fork 266 with the ram 264 of the pneumatic cylinder 262 retracted. When so disposed, the reference cylinder B is offset to the side of the platen 88 and does not interfere with parts D that are placed on the platen 88 to be measured. However, to calibrate the machine A, the pneumatic cylinder 262 is energized and its ram 264 is extended. The ram 264 moves the reference cylinder B over the platen 88 of the elevating unit 16 and stops when the axis of the cylinder B coincides with the vertical measuring axis Z. At that time, the elevating unit 16 moves its table 86 upwardly slightly to free the cylinder B from the fork 266, and the ram 264 withdraws the fork 266. The elevating unit 16 then raises the reference cylinder B to the region of the probe tips 236, whereupon the cylinder B is centered using one of the probes 190 to push it to the position in which its axis coincides precisely with the measuring axis Z. Thereupon, the clamping unit 18 is energized to clamp the reference cylinder B against the platen 88, and the elevating unit 16 and measuring heads 20 are energized to bring various surfaces on the cylinder B into alignment with the probe tips 236 of the three measuring heads 20. Indeed, the tips 236 are brought against the external cylindrical surface 268, the surface of the bore 278 and the two end faces 274 and 276 and readings are derived from the linear encoders 104 and 180 and the LVDTs 224 of each measuring head 20. These readings, which represent known values, are stored in the memory of the computer C and serve to calibrate the LVDTs 224. Other readings taken from the reference cylinder B, after that cylinder has been centered precisely on the axis Z, provide a traceable reference standard for the machine A.

After the platen 88 is lowered to a proper position, the pneumatic cylinder 262 extends its ram 264 to again place the fork 266 under the shoulder 272 of the reference cylinder B. The elevating unit 16 then drops the platen 88 to its initial position, whereupon the ram 262 withdraws the cylinder B to its storage position.

The computer C is connected to and controls the operation of the servomotor 60 for the loading unit 14, the servomotor 94 for the elevating unit 16 as well as the motor 112 in the rotary table 86 of the unit 16, and the servomotors 166 in the three measuring heads 20. It further controls electrically operated valves through which compressed air is admitted to the pneumatic devices 101 for the friction drives 97 of the elevating unit 16 and to the cylinder 250 of the discharge unit 24 and the cylinder 262 of the carrier unit 22. In addition, it receives measurements in the form of electrical signals from linear encoder 64 of the loading unit 14 to determine the position of the loading head 72 and from both the linear encoder 104 and the rotary encoder 114 of the elevating unit 16 to determine the position of the platen 88 along the measuring axis Z and its angular position about that axis as well. Also, the computer C derives measurements in the form of digitized electrical signals from both the linear encoder 180 and LVDT 224 of each measuring head 20 and algebraically adds them to determine the precise position of each probe tip 236 from the measuring axes Z.

Aside from the internal dimensional information that it derives, the computer C is provided with disk drives and the keyboard K for receiving external information. Indeed, it is through the disk drives that the operating programs are introduced into the computer C. Moreover, through the disk drives and keyboard K, specifications for parts are entered into the computer C, including tolerances for the various dimensions on such parts.

The computer C is coupled to the CRT T for displaying measurements derived from the various measuring devices, either numerically or graphically, and these displays may be accompanied with the tolerances. One particularly effective display which the computer C is capable of producing shows the profile of the part, along with a tolerance envelope (FIG. 16). The former is of course derived from the various measuring devices on the machine A, while the latter is supplied externally. If the measured profile for the part falls within the tolerance envelope, then the part is acceptable, but if any portion of the profile crosses over the lines which define the envelope, then the part may not be acceptable. The visual display shows precisely where the deviation exists without the need for any calculations.

OPERATION

Before the machine is placed in operation, the operating program for the computer C is loaded into the computer C along with specifications for the various parts that are to be measured. Moreover, the machine A is calibrated.

To calibrate, the pneumatic cylinder 262 of the carrier unit 22 is energized, and its ram 264 moves the reference cylinder B over the platen 88 on the rotary table 86 of the elevating unit 16. The unit 16 elevates the table 86, bringing the platen 88 against the lower end face 274 of the reference cylinder B, and raises the reference cylinder B slightly thereby freeing from the fork 266, whereupon the pneumatic cylinder 262 retracts its ram 264 and the fork 266 that is on it. Then the elevating unit 16 raises the reference cylinder B still further to the elevation of the three probe tips 236. With the reference cylinder B stabilized by the clamping unit 18, the three probe tips 236 are driven against the reference cylinder B and the LVDTs for their probes 190 are calibrated, using the linear encoders 180 for the measuring heads 20 which carry those probes 190 as the reference for the calibration.

Thereafter the table 86 rotates the reference cylinder B with one probe tip 236 against its external surface 268 to locate the high spot, and then with the clamping rollers 150 retracted, the reference cylinder B is pushed to the center of the table 86 with that probe tip 236, so that the axis of the reference cylinder B coincides precisely with the measuring axis Z. Once centered, the reference cylinder B is clamped securely against the platen 88 with the clamping unit 18.

Next the tips 236 of the three probes 190 are driven against the external cylindrical surface 268 of the reference cylinder B to calibrate the LVDTs 224, using the linear encoders 180 of the measuring heads 20 as the reference for calibration. Then, using the surface 268, the bore 278 and the end faces 274 and 276 as known locations, the linear encoders 104 and 180 are referenced, and this of course identifies a particular location on the grating for each linear encoder with a known dimension.

Once calibration is completed, the reference cylinder B is retrieved by the ram 264 and its fork 266 and carried to its storage position remote from the table 86.

With the calibration completed, the machine A is in condition for measuring the part D or for that matter any part of generally circular cross-section, as long as it will fit on the measuring table 86, for it is not necessary to recalibrate to accommodate a part of different size or shape. The specification for the part D that is to be measured is entered into the memory of computer C, either through the keyboard K or by calling it up from a magnetic disk in one of the disk drives. This informs the computer C of the precise size of the part D so that the machine A may physically handle the part D, and further provides the tolerances for the part D.

The part D is placed on the vibratory carpet 44 of the conveyor 12 which advances it toward the extended slide 54 of the loading unit 14. Indeed, the stop 74 on the loading head 72 of the slide 54 intercepts the part D, placing it before the angulated drive bars 76. At this time the servomotor 60 is energized and it retracts the slide 54. This movement centers the part D with respect to the vertex of the loading head 72, and the head 72 draws the part D across the carpet 44 and loading deck 32 and onto the platen 88 of the elevating unit 16. The slide 54 stops when the axis X of the part D coincides with the measuring axis Z or is at least within a few thousandths of an inch of the axis Z. In this regard, the diameter of the part D exists within the memory of the computer C, and from this diameter the computer C determines the distance that the slide 54 must be retracted in order to bring the axis X of the part D into alignment with the measuring axis Z. The encoder 64 monitors the movement of the slide 54. As the slide 54 retracts the computer C compares its actual position with the position required for alignment, and when the latter is reached, the computer de-energizes the servomotor 60. Thereupon, the servomotor 60 moves slide 54 back to its fully extended position.

When the loading slide 54 returns to its extended position, the servomotor 94 of the elevating unit 16 is energized, and it acting through the friction drive 97 having the greater pitch elevates the table 86 and the part D that is upon it. The elevating unit 16 drives the upper end face 6 of the part D into the rollers 150 of the clamping unit 18 and drives those rollers and the brackets 142 on which they are carried upwardly, so that the brackets 142 compress the springs 144 against the spider 138 until the force exerted by all of the springs 144 balances the force imposed by the pneumatic cylinder 134.

Assuming that the user desires to measure the radius of the tapered outside face 2 on the part D and to determine its contour, the servomotor 94 of the elevating unit 16 then continues to move the slide 84 and its rotary table 86 upwardly, and the part D rises with the platen 88. Since the pneumatic cylinder 134 is designed to maintain a constant pressure within the cylinder 134, the holddown force exerted by the rollers 150 on the part D remains the same. The slide 84 stops when the platen 88 is slightly below, perhaps 0.1 inches (2.5 mm.) below, the elevation of the front contact points 238 on the tips 236 of the three probes 190. The encoder 104 registers the extension of the slide 84, while the computer C monitors the encoder 104, and thus when the encoder 104 registers the prescribed extension, the computer C de-energizes the servomotor 94.

Next the computer C energizes the servomotors 166 of the three measuring heads 20, and they drive their respective slides 164 inwardly, carrying the probes 190 with them. The computer C contains within its memory the radius of the part D and if the tips 236 of the three probes 190 do not encounter the part D near the radius prescribed for the part D, then the computer C causes the motors 166 to retract the probes 190, and thereafter causes the part D to be ejected. At the same time it produces on the CRT T a message that the part D was not sufficiently within the expected size to allow the prescribed measurement to proceed.

Assuming that the part D possesses the expected diameter, then the probes 190 at their tips 236 will come against its outside face 2. The computer C monitors each encoder 180, and detects the presence of the part D by reason of a signal derived from the LVDT 224 of the probe 190. In this regard, as the probe 190 approaches the part D, the movable section 202 of the main body 192 for the probe 190 remains in its neutral position, as does the core 228 of LVDT 224. However, when the tip 236 of the probe 190 contacts the part D, it causes the probe arm 232 to deflect, and this in turn causes the movable section 202 to pivot on the fixed section 200 at the flexure 206 and to drive the core 228 upwardly within the coil 226. As a consequence, the LVDT 224 sends a signal to the computer C, and this signal also passes through the feedback loop to the motor 166, causing the motor 166 to stop and thereby terminate further advancement of the probe tip 236. Actually, the feedback loop is designed such that the motor 166 always attempts to position the slide 164 such that the probe tip 236 has a prescribed deflection, 0.005 inches (0.127 mm.) for example. The space between the measuring axes Z and the point at which the probe tip 236 for each head 20 contacts the outside face 2 of part D is of course the radius measured by the linear encoder 180 of the head 20 plus the deflection of the probe tip 236 measured by the LVDT 224 for that head 20. From the radii registered by the three heads 20, the computer C, using preferably a best fit circle algorithm, further calculates the radius R of the face 2 at the elevation where the probe tips 236 contact it and also the center of the best fit circle. Since the radius R which is so determined is derived from best fit circle calculations, it is accurate even though the axis X of the part D does not precisely align or coincide with the measuring axis Z.

Having established contact with the peripheral surface of the part at all three probes 190, that is along the front contact points 238 for the tips 236 of the probes 190, the servomotor 94 for the elevating unit 16 is again energized to move the slide 84 downwardly, and of course the part D with it. The probe tips 236, being against the outer face 2 of the part D, slide over that face, or more specifically, the front contact points 238 bear against and slide over the face 2. The points 238 remain against the face 2, irrespective of whether the surface is cylindrical, concave, convex, tapered, or of practically any other profile, because the feedback loop between the LVDT 224 of each probe 190 and the servomotor 166 always drives the motor 166 so as to maintain a predetermined deflection at the probe tip 236. Thus, the contact points 238 on the three probe tips 236 slide over the exterior surface of the part D, until the contact points 238 on the three probe tips 236 reach the upper region of the outside face 2, whereupon the computer C de-energizes the motor 94 and energizes the slide motors 166 to retract the probes 190. In this regard, the length of the face 2 is part of the specification introduced into the memory of the computer C, and by monitoring the linear encoder 104 of the elevating unit 16, the computer C recognizes when the part C has dropped a distance equal to the length of the surface that is measured.

At periodic intervals during the movement of the part D, which intervals are typically 0.005 inches (0.127 mm.), the computer C synchronously accepts readings registered by the linear encoder 180 and the LVDT 224 of each measuring head 20. It algebraically combines the readings from each head 20 to obtain the radii RO, R120 and R240 measured by the heads 20, and calculates the radius R and center of the best fit circle for the part D at the particular location. Indeed, each reading from the three heads 20, as well as the calculated radius R and circle center derived from those readings, is correlated with a reading derived from the linear encoder 104 of the elevating unit 16 at the very same instant, thus identifying each calculated radius R with a particular position or data point along the measuring axis Z. From the numerous calculated radii R and the axial positions with which those radii identify, it is possible to provide an axial profile of the outer face 2 for the part D as well as the deviation of its axis X from the measuring axis Z (FIG. 16a).

The profile which is so produced may be displayed numerically, but it is better to accompany any numerical display with a graphical display. Moreover, both the numerical and graphical displays may be produced along with tolerances, and the tolerances may take the form of an envelope, that is to say, spaced apart lines that represent a range in which the ideal profile for this part falls (FIG. 16a).

Since the calculated radius R at each interval along the axis Z represents the radius of a true circle regardless of its center, it is not too significant that the axis X of the part D may deviate slightly from the measuring axis Z during the elevation of the part D. Moreover, the large number of readings statistically minimizes the effect of any error which might exist in any one reading. Thus, the fact that some of the readings may derive from small surface abnormalities, such as machining grooves, is of little concern. Similarly, the calculation of the true radius R regardless of the center of the circle allows the slideways 82 and the bearings for the slide 84 which moves along those slideways 82 to be constructed with less precision than the actual calculated radii R derived from the machine A.

In addition to measuring the radius R of the face 2 and determining its axial profile, the machine A may also measure the circumferential profile of that face to determine deviation from round. To make this measurement, only one of the probe tips 236 at its front contact point 238 is brought against the outside face 2 of the part D, this being achieved by energizing the servomotor 166 for the measuring head 20 on which that probe tip 236 is located until the contact point 238 on that tip 236 comes in contact with and is deflected the prescribed distance by the face 2. This deflection is sensed by the LVDT 224 for the measuring head 20. With the contact point 238 of the probe tip 236 being against the outside face 2 of the part D, the motor 112 of the rotary table 86 is energized, and it causes the platen BB, and the part D which is on the platen 88, to rotate about the measuring axis Z. The clamping unit 18 continues to hold the part D against the platen 88, its rollers 150 bearing against the upper face 6 of the part D and turning while the part D revolves beneath them.

The point 238 of the probe tip 236 remains against the outer face 2, allowing the probe tip 236 to follow that surface, circumferentially this time, and any deviations from a truly circular profile are registered by movement of the probe tip 236. These movements are detected by the LVDT 224 of the probe 190, and the actual radius RO at any point along the circumference is calculated by the computer C which simply adds algebraically, the reading derived from the linear encoder 104 of the activated measuring head 20 and the reading registered by the LVDT 224 for the probe 190 of that head 20. Actually a multitude of readings are taken typically at 1024 intervals which are 0.351° apart. The computer C identifies each radial measurement with the angular position $\theta$ of the table 86 at the very instant of the readings for that measurement, and that angular position is derived from the rotary encoder 114 within the table 86.

The radii R0 and the angular positions θ at which they exist may be displayed numerically, or graphically (FIG. 16b). The measured circumferential profile is particularly useful in detecting minute lobes or chatter on the outside face 2 of the part D.

The machine A can also determine the radial profile of the upper end face 6 on the part D. To this end the servomotor 166 of one of the measuring heads 20 positions the slide 164 of that head 20 such that the front contact point 238 is directly over the upper face 6 near one of the edges on that surface. Then the servomotor 94 of the elevating unit 16 is energized to move the table 86 and the part D that is on it upwardly, whereupon the part D at its end face 6 contacts the probe tip 236 at the front contact point 238 for that tip. The movement continues until the LVDT 224 of the probe 190 registers a prescribed deflection in the probe tip 236, whereupon the feedback loop operates the servomotor 94 such that the elevating unit 16 seeks to maintain a constant deflection in the probe 190, as sensed by the LVDT 224. Thereupon the servomotor 166 of the measuring head 20 is again energized to draw the contact point 238 over the upper face 6. Variations in elevation appear as deflections in the probe tip 236. Indeed, at closely spaced intervals the computer C obtains readings from the LVDT 224 and the linear encoder 104 of the elevating unit 16 to determine the precise elevation of the upper surface 6 of the part D at that point, and further identifies each calculated elevation with a radial position which is derived from linear encoder 180 of the measuring head 16 and the LVDT 224.

The results of the scan over the upper face 6 are retained in the memory of the computer C and may be displayed both numerically and graphically. The scan for the radial profile may be made by all three probes 190 or just one probe 190.

The machine A can measure the diameter of the inside face 4 and determine the profile of that face as well, and this is achieved much the same as the measurements on the outside face 2, except that the rear contact point 240 of each probe tip 236 is brought against the inside face 4, instead of the front contact point 238. Moreover, the three probes 190 during the initial positioning, are brought together with their probe tips 236 obviously at a higher elevation than the upper face 6 of the part D. Then the servo motor 94 of the elevating unit 16 is energized to raise the part D until the three probe tips 236 are within the hollow interior of the part D. Next the servomotors 166 of the three measuring heads 20 retract their respective slides 164 and the probes 190 on them until the rear contact points 240 on the three probe tips 236 come against the inside face 4 of the part and indeed are deflected the prescribed distance. At this time the servomotor 94 of the elevating unit 16 is again energized to raise the part D, and the computer C obtains readings from the three measuring heads 20 at closely spaced intervals, identifying each reading with an axial position derived from the linear encoder 104 of the elevating unit 16. The scan may continue all the way to the very bottom of the inside face 4, even though the rear contact points 240 are positioned somewhat above the remaining portions of their respective tips 236, because the radial slots 89 in the platen 88 on which the part D rests accommodate the downwardly projecting portions of the tips 236.

Furthermore, the machine A may measure the elevational profile of the upper end face 6 on the part D from a circumferential standpoint to determine deviation from flat. To do so, one of the probe tips 236 at its front contact point 238 is brought against the upper surface 6, and the table 86 and the part D on it is turned through one revolution while elevation measurements are calculated at closely spaced intervals from readings derived from the probe 190 and the linear encoder 104 of the elevating unit 16.

Figures 17A, 17B:
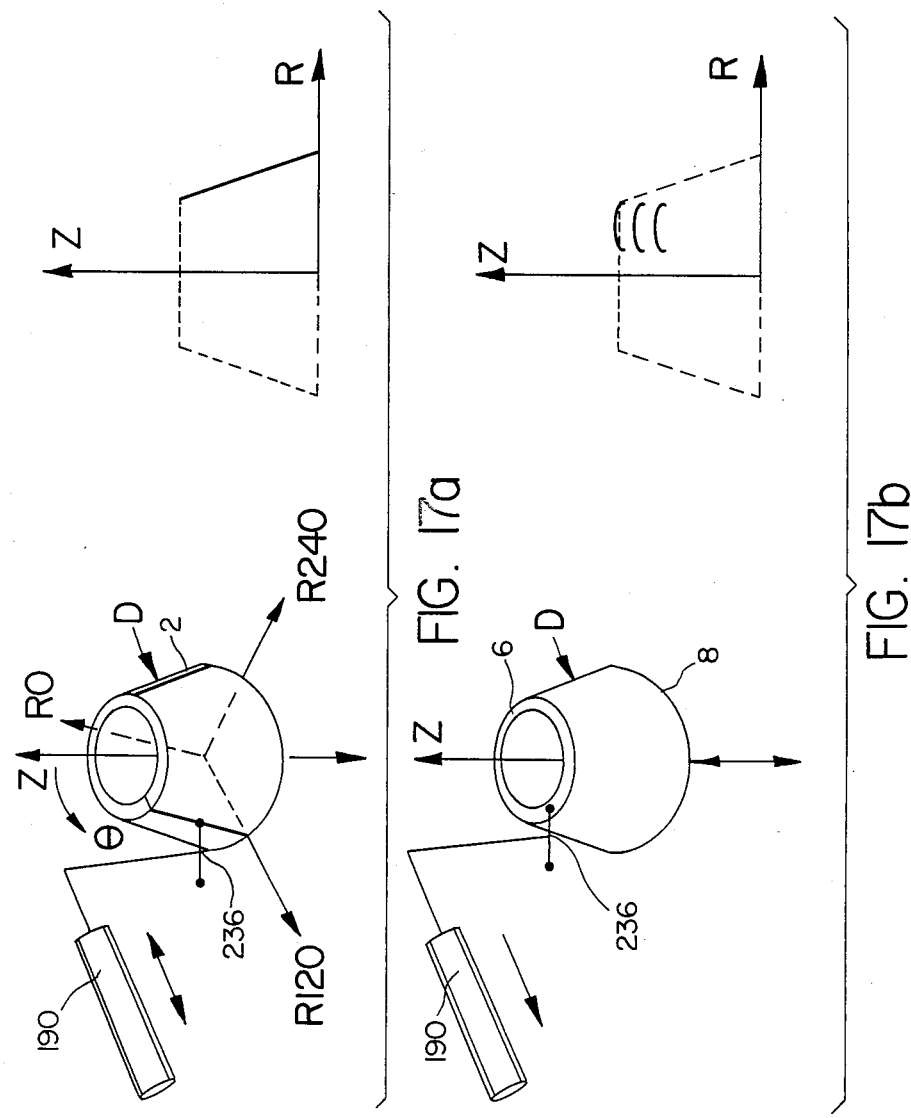

Actually the machine A performs its measurements by superimposing on the part D a cylindrical coordinate system having at least three axes, namely the measuring axis Z, at least one radial axis R0, and a rotational axis θ, and then makes measurements along all or some of the three axes. In many measurements two additional radial axes R120 and R240 are imposed so that the coordinate system has five axes, namely R0, R120, R240, Z, and θ. The system lends itself to several scanning modes for determining profiles or deviations from some established norm. Those scanning modes may be summarized as follows:

1. Axial scan (FIG. 17a). The three tips 236 of the probes 190 are brought against a circumferentially extending surface, such as either one of the faces 2 or 4 of the part D, and are maintained against that surface by the servomotors 166 of their respective measuring heads 20. Radial dimensions along the three radii R0, R120 and R240 are derived by algebraically combining readings from the linear encoders 180 of those measuring heads 16 and their respective LVDTs 224. The actual scanning exists along the measuring axis Z and the motion for this scanning is imparted by the servomotor 94 in the elevating unit 16. The data points at which successive measurements of the radial axes are taken exist along the measuring axis Z and the precise location of each is measured by the linear encoder 104 of the elevating unit 16 and the LVDT 224. The result is a profile that in terms of direction follows the measuring axis Z and of course includes the calculated radii R along that profile.

2. Radial scan (FIG. 17b). Here the tip 236 of at least one probe 190 is brought against generally radially directed surfaces, such as either one of the end faces 6 and 8 on the part D, but this time the servomotor 94 for the elevating unit 16 maintains the tip 236 in contact with the radially directed surface. The scanning exists along the radial axis R120 for the probe 190 and the motion by which it is derived is imparted by the servomotor 166 of the measuring head 20 for the probe 190. Elevational or axial dimensions are derived by algebraically combining readings from the linear encoder 104 for the elevating unit 16 and the LVDT 224 for the probe 190 which is carried across the radially directed surface. The data points at which the axial measurements are taken exist along the radius R120 and are measured by the linear encoder 180 of the measuring head 20 combined with the horizontal component of the LVDT 224. The rotary encoder 114 establishes the angular position θ of the radius R120 along which the scan is made. The result is a profile that follows the radius R120 along which the scan is made. Actually, three simultaneous scans may be made, one with each of the three probes 190 in which case three profiles are derived.

3. Rotary scan on a circumferentially extending surface (FIG. 17c). Here one measuring head 20 brings the tip 236 of its probe 190 against a circumferential extending surface, such as either one of the surfaces 2 and 4 on the part D, with its servomotor 166 for the head 20 maintaining the tip 236 against the surface. The scanning exists along the rotational axes θ and is derived from the servomotor 112 for the rotary table 86 which carries the platen 88. The measurements are made along the radial axis R120 by combining readings derived from the linear encoder 180 and LVDT 224 of the activated measuring head 20. The data points lie along the rotational axis θ and are measured by the rotary encoder 114. The servomotor 94 of the elevating unit 16 is rendered inactive so no motion occurs along the measuring axis Z. The result is a trace which depicts deviation from round. For this scan, the axis of the scanned surface should coincide precisely with the measuring axis Z and to achieve this end, the centering capabilities of the machine A may be employed.

4. Rotary scan on an end face (FIG. 17d). In this scan, tip 236 of the probe 190 on one of the measuring heads 20 is brought against a surface through which the measuring axis Z passes, such as the end face 6 on the part D, with the servomotor 94 of the elevating unit 16 this time maintaining the probe tip 236 in contact with the surface. The elevational measurements which are in the axial direction, are obtained by algebraically combining readings from the linear encoder 104 for the elevating unit 16 and the LVDT 224 for the active probe 190. The scanning occurs along the rotational axis θ and the motion for it is derived from the servomotor 112 for the rotary table 86 which turns the platen 88. The data points lie along the rotational axis θ and are measured by the rotary encoder 114 of the table 86. The servomotor 166 for the active measuring head 20 remains at rest so no motion occurs along the radial axis R120. The result is a trace that depicts deviation from a plane which is perpendicular to the axis x, more commonly referred to as deviation from flat or parallel.

The machine A has safety features built into it to protect it from crashes, that is to protect any of its slides 84 and 164 and related components and particularly the probes 190 from damage in the event any one of the probe tips 236 encounters an obstacle that will not yield. This crash protection can be thought of in three levels. The first level is the analog servo loop, that is, if the probe tip 236 encounters an unexpected surface, the servo system immediately retracts the probe 190 and causes the probe 190 to travel around the unexpected surface or obstruction. The second level of protection, if the servo system fails to function, is the ability of friction drives 97 and 173 to slip if a probe 190 becomes jammed. The third level of protection is the crash protection in the probe 190 itself, and in particular the physical stops created by boss 214, the case 194 and the fixed section 200.

Figure 15:
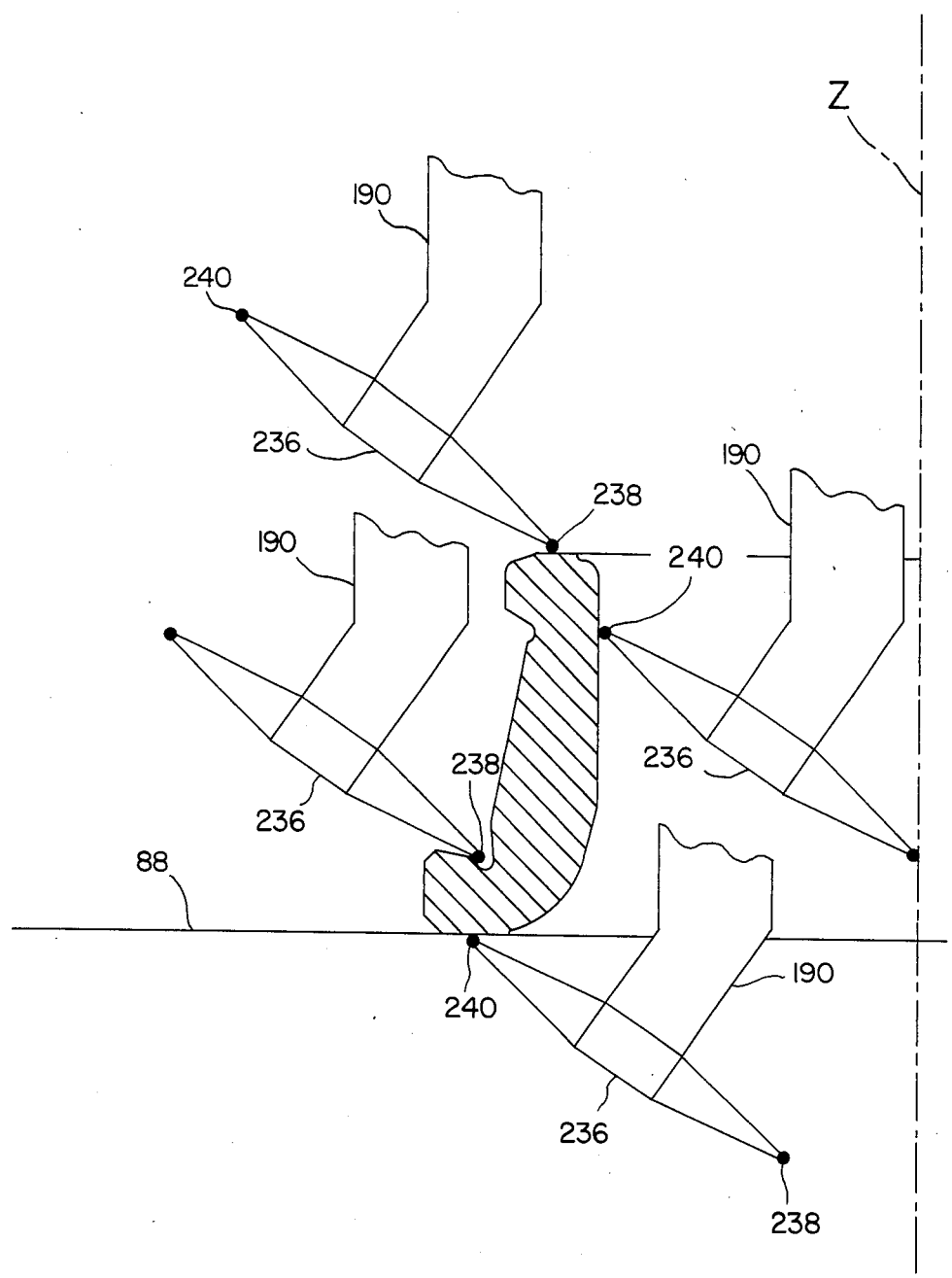
FIG. 15 is a schematic view showing a tapered roller bearing cone in section and the probe tip at various positions where measurements are taken along it.

The measuring machine A is particularly useful for measuring the races of bearings, particularly the somewhat complex configurations of tapered roller bearing cones (FIG. 15). Indeed, the machine A may be used to measure the size and profile of the cone bore, the length of the cone and the size and profile of its raceway.

Additionally the machine A can measure chamfers, radii, blends and undercuts using similar techniques. Furthermore, in a more generic sense, the machine can measure geometric features such as flatness, straightness, circularity, cylindricity, perpendicularity, angularity, parallelism, profile of a line or surface, runout (circular), runout (total), concentricity, and wall thickness. In a peripheral sense, its measurements are not confined to truly circular surfaces, for it may be used to measure peripheral surfaces of other geometric shapes such as ellipses, lobed configurations, and even polygons.

This invention is intended to cover all changes and modifications of the example of the invention herein chosen for purposes of the disclosure which do not constitute departures from the spirit and scope of the invention.

What is claimed is:

1. A machine for measuring an object, said machine comprising: a frame; support means on the frame for supporting the object along a measuring axis with the axis of the object generally coinciding with the measuring axis and for further moving the object parallel to the measuring axis, means for ascertaining the position of the support means along the measuring axis; at least three measuring heads located on the frame around the measuring axis with each having a probe provided with a tip that is adapted to contact and bear continuously against the object as the support means moves the object parallel to the measuring axis, each measuring head being capable of moving the tip of its probe along a radius that emanates from the measuring axis; and means for ascertaining the position of the probe tip for each measuring head with respect to a fixed reference on the frame, whereby the object is measured as it moves parallel to the measuring axis.

2. A machine according to claim 1 wherein the fixed reference is the measuring axis.

3. A machine according to claim 1 wherein the measuring heads are arranged so that their probe tips contact the object symmetrically around the measuring axis.

4. A machine according to claim 1 wherein each probe tip is located along a radius emanating from a common point on the measuring axis, and each measuring head moves its probe tip along the radius for that measuring head.

5. A machine according to claim 1 wherein the means for ascertaining the position of the probe tip determines the position in terms of distance from the measuring axis and location along the measuring axis.

6. A machine according to claim 5 wherein the means for ascertaining the position of the probe tips does so at synchronized intervals as the relative position of the object and probe tips along the measuring axis is changed, and for each axial interval at which the position of the probe tips is ascertained, identifies the probe tip positions with an axial position for the object.

7. A machine according to claim 1 and further comprising means for rotating the support for the object with the axis of rotation coinciding with the measuring axis, and means for determining the angular position of the support as it is rotated.

8. A machine for measuring an object, said machine comprising: a frame; an elevating unit carried by the frame and including a platen for supporting the object along an upright measuring axis, with the axis of the object coinciding generally with the measuring axis, the elevating unit further including first drive means for moving the platen upwardly and downwardly parallel to the measuring axis and first measuring means for determining the displacement of the platen along the measuring axis; at least three measuring heads mounted on the frame around the measuring axis with each head including a probe having a tip and second drive means for moving the probe toward and away from the measuring axis generally along a radius that intersects the measuring axis, whereby the probe tips may be brought into contact with a surface on the object, each measuring head further including second measuring means for determining the displacement of its probe parallel to the radius along which its tip lies, the radii along which the probe tips for the measuring heads move being arranged symmetrically around the measuring axis.

9. A machine according to claim 8 wherein the first drive means changes the elevation of the platen and the object that is on it while the probe tips remain against the object; and wherein the second drive means imparts a bias to the probe tip to hold the tip against the object.

10. A machine according to claim 9 wherein each measuring head includes a slide base attached to the frame and a slide mounted on the slide base such that it can move parallel to the radius along which its probe tip lies, the probe for the measuring head being carried by the side; wherein the second measuring means on each measuring head includes means for determining the displacement of the slide relative to the slide base, and wherein the probe includes means for determining the displacement of the probe tip relative to the slide and relative to the platen.

11. A machine according to claim 10 wherein the means for determining the displacement of the slide relative to the base includes a linear scale having a succession of lines on it in the form of a grating and a transducer for detecting the lines on the grating, the scale being mounted on the base or slide with its grating parallel to the radius for the measuring head and at the elevation of the probe tip and the transducer being mounted on the other.

12. A machine according to claim 11 wherein the means for determining the displacement of the probe tip relative to the slide and platen comprises a linear variable differential transformer mounted on the probe.

13. A machine according to claim 9 wherein each probe includes a fixed section which is attached firmly to the slide and a movable section which pivots relative to the fixed section and carries the probe tip, with the tip being fixed in position relative to the movable section and causing the movable section to pivot when displaced generally along the radius for its measuring head, and means for measuring the displacement of the movable section relative to the fixed section.

14. A machine according to claim 13 wherein the probe further includes a probe arm which extends generally vertically between the probe tip and the movable section for transmitting displacement of the probe tip to the movable section.

15. A machine according to claim 8 wherein the elevating unit further includes a slide base attached to the frame; a slide mounted on the slide base such that it moves relative to the base parallel to the measuring axis, a rotary table carried by the slide and having the platen mounted thereon so that the platen may be rotated by the table with its axis of rotation being the measuring axis, the table including a third drive means for rotating the platen and third measuring means for determining its angular displacement.

16. A machine according to claim 15 wherein the first measuring means includes a scale having a succession of lines marked on it in the form of a grating and a transducer for detecting the lines, the scale being mounted on the slide base or slide with its grating parallel to the measuring axis and the transducer being mounted on the other.

17. A machine according to claim 8 wherein the frame includes a loading deck and the elevating unit is capable of moving the platen vertically to a loading position in which it is flush with the loading deck; and further comprising a loading unit including a loading head that is configured to engage the object, and means for moving the loading head such that it moves the object over the loading deck and onto the platen and for positioning the object on the platen with its axis generally coinciding with the measuring axis.

18. A machine according to claim 17 wherein the loading unit includes a slide base attached to the frame and a slide mounted on the base and movable thereon, and means for measuring the displacement of the slide relative to the slide base; and wherein the loading head is attached to and carried by the slide of the loading unit.

19. A machine according to claim 8 and further comprising a reference cylinder of known dimensions, and means for moving the reference cylinder onto the platen with its axis coinciding with the measuring axis and for retracting it from the platen.

20. A process for measuring an object, said process comprising: supporting the object opposite three probe tips which are located along radii that intersect at a measuring axis which generally coincides with the axis of the object; moving the probe tips along their respective radii until they contact a circumferentially extending surface on the object with a spring bias; while the probe tips are in contact with the circumferentially extending surface on the object, effecting relative movement between the object and the probe tips, with such movement being parallel to the measuring axis; measuring the radial position of each probe tip with respect to the measuring axis and the position of the object along the measuring axis at spaced apart intervals during the relative movement; and from the radial positions of the three probe tips at each interval calculating the radius of the circumferentially extending surface at that interval, whereby the profile of the surface may be ascertained.

21. The process according to claim 20 wherein each probe tip is carried on a slide that moves on a base parallel to the radius along which the probe tip is located, and the probe tip is capable of moving relative to the slide against a bias; wherein the step of moving the probe tip along its radius and into contact with a circumferentially extending surface on the object includes bringing the probe tip into a position in which it is biased against the object; and maintaining the probe tips biased against the object as the object moves relative to the probe tips.

22. The process according to claim 20 wherein the step of measuring the position of each probe tip includes measuring the position of the slide relative to the measuring axis and measuring the displacement of the probe tip relative to the slide along the radius for that probe tip.

23. The process according to claim 20 and further comprising bringing the probe tips against a reference surface of known size to calibrate before bringing the probe tips against the object.

24. A machine for measuring an object by superimposing on that object a cylindrical coordinate system that contains a measuring axis from which radial dimensions are taken and about which angular measurements are made, said machine comprising: a frame through which the measuring axis passes; support means on the frame for supporting the object along the measuring axis; at least one measuring head on the frame and having a probe provided with a tip that lies along a radius emanating from the measuring axis; first drive means for effecting relative translational movement between the support means and the probe parallel to the measuring axis when the probe tip is against the object; second drive means for moving the probe in translation such that its tip moves generally along the radius toward and away from the measuring axis while remaining against the object; third drive means for effecting relative rotation between the probe and the support means about the measuring axis with the measuring axis forming the center of the rotation while the probe tip is against the object; first measuring means for measuring the relative translational movement along the measuring axis; second measuring means for measuring the translational movement of the probe along the radius; third measuring means for measuring the relative angular movement between support means and probe; fourth measuring means for measuring the position of the probe tip relative to the measurements derived from the second measuring means when the first drive means effects relative movement parallel to the measuring axis or when the third drive means effects relative rotational movement about the measuring axis and for measuring the position of the probe tip relative to the measurements derived from the first measuring means when the second drive means moves the probe tip along the radius or when the third drive means effects relative rotational movement about the measuring axis.

25. A machine according to claim 24 and further comprising means for obtaining measurements from the fourth measuring means at closely spaced increments when any of the drive means causes the probe tip to move over the object.

26. A machine according to claim 24 wherein the measuring head is one of at least three measuring heads, each having a probe provided with a probe tip that lies along a radius emanating from the measuring axis, and wherein the radii along which the probe tips lie are arranged symmetrically about the measuring axis.

27. A process for measuring an object by superimposing on the object a cylindrical coordinate system having five axes, namely a measuring axis Z, three radial axis R that emanate from the measuring axis Z, and a rotational axis $\theta$ having its center at the measuring axis Z, said process comprising: supporting the object along the measuring axis Z such that the axis Z passes through the object; moving the probe tips along the radial axes R until the tips contract the object; effecting relative movement between the object and the probe tips while maintaining the probe tips biased against the object so that the probe tips pass over the object, the relative movement being parallel to measuring axis 2; and measuring deflections of the probe tips parallel to their radial axes R at closely spaced intervals along the measuring axis 2, whereby a profile of the part is derived.

28. A machine for measuring an object, said machine comprising: a frame; support means on the frame for supporting the object along a measuring axis that is fixed in position relative to the frame, with the axis of the object generally coinciding with the measuring axis; at least three measuring heads located on the frame around the measuring axis along radii which emanate from a common point along the measuring axis; each measuring head including: a base which is mounted on the frame, a slide which moves on the base parallel to the radius along which the heads is located, a probe carried by the slide and having a tip located generally on the radius for the head, with the tip being presented toward the object for bearing against the object, drive means for moving the slide on the base both toward and away from the measuring axis, so that the probe tip moves along the radius, first measuring means for monitoring the position of the slide relative to the base, and second measuring means for monitoring the position of the probe tip relative to the slide, whereby the position of the probe tip relative to the measuring axis is known.

29. A machine according to claim 28 and further comprising elevating means for effecting relative movement between the frame and the support means parallel to the measuring axis, and third measuring means for ascertaining the position of the support means along the measuring axis.

30. A machine according to claim 28 wherein the first measuring means includes a scale having a succession of lines that form a grating on it and a transducer for detecting the lines on the grating, one being mounted on the slide and the other being mounted on the base; and wherein the grating lies generally at the elevation of the radius along which the probe tip is located.

31. A machine according to claim 30 wherein the second measuring means is a linear variable differential transformer.

32. A machine according to claim 29 wherein the drive means for each measuring head is capable of urging the probe tip for its measuring head against the object when the elevating means effects relative movement between the support means and the frame along the measuring axis.

* * * * *